(12) United States Patent
Tsuchiya et al.

(10) Patent No.: US 7,341,403 B2
(45) Date of Patent: *Mar. 11, 2008

(54) METHOD OF CONSTRUCTING INFORMATION CORRESPONDENCE PIPE, CONSTRUCTED STRUCTURE, AND CONSTRUCTION MEMBER

(75) Inventors: Fumiaki Tsuchiya, Chiba (JP); Isaburo Yagi, Hyogo (JP); Masaru Yamakawa, Hyogo (JP); Yasuhiro Ueda, Osaka (JP); Osamu Ishizuka, Hyogo (JP); Koji Aso, Osaka (JP); Yukikazu Maemoto, Hyogo (JP); Takaaki Hirokawa, Osaka (JP); Hirofumi Nakatsuka, Nara (JP)

(73) Assignees: Sanki Engineering Co., Ltd., Tokyo (JP); Ashimori Industry Co., Ltd., Osaka (JP); Ashimori Engineering Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/487,698

(22) PCT Filed: Nov. 22, 2002

(86) PCT No.: PCT/JP02/12224

§ 371 (c)(1),
(2), (4) Date: Feb. 25, 2004

(87) PCT Pub. No.: WO03/044918

PCT Pub. Date: May 30, 2003

(65) Prior Publication Data

US 2004/0253057 A1    Dec. 16, 2004

(30) Foreign Application Priority Data

Nov. 22, 2001 (JP) .............................. 2001-356953
Jul. 8, 2002 (JP) .............................. 2002-198850
Jul. 8, 2002 (JP) .............................. 2002-198861

(51) Int. Cl.
*F16L 7/00* (2006.01)
*F16L 3/04* (2006.01)

(52) U.S. Cl. .............................. 405/183.5; 405/184.4; 138/178; 248/58; 248/62

(58) Field of Classification Search ............. 405/154.1, 405/183.5, 184, 184.2, 184.4; 385/134, 136, 385/137, 53, 55; 138/111, 112, 115; 248/58, 248/61–63

See application file for complete search history.

(56) References Cited

U.S. PATENT DOCUMENTS 4,366,939 A * 1/1983 McMillan .................. 248/68.1

(Continued)

FOREIGN PATENT DOCUMENTS

DE         297 00 912 U1    4/1997

(Continued)

*Primary Examiner*—Tara L Mayo
(74) *Attorney, Agent, or Firm*—Wolf, Greenfield & Sacks, P.C.

(57) ABSTRACT

The object is to provide a construction method of an information-communicable underground pipe whereby communication cables can be readily laid in an underground pipeline having a main pipe and branch pipes branched therefrom thereby allowing the underground pipeline to be used as an information-communicable underground pipe, and to provide a construction structure and a construction member therefor. The construction method of an information-communicable underground pipe comprises inserting a sheath pipe (1) into an underground pipeline (17, 7) through a manhole (9, 10), the sheath pipe having a main body (3) formed with an empty room (2) for installing a communication cable (6) thereinto and a high-strength low-elongation material element (4) integrally formed in the main body (3) along the length of the main body (3), and securing the high-strength low-elongation material element (4) onto the inner wall of said manhole (9, 10) by applying tension thereon to secure the sheath pipe (1) in the substantially upper part inside the underground pipeline (17, 7).

13 Claims, 26 Drawing Sheets

U.S. PATENT DOCUMENTS

| | | | | |
|---|---|---|---|---|
| 4,475,629 | A | * 10/1984 | Jonnes | 184/15.1 |
| 4,647,251 | A | * 3/1987 | Gale | 405/184.4 |
| 5,236,016 | A | * 8/1993 | Vogelsang | 138/115 |
| 6,304,698 | B1 | * 10/2001 | Morris | 385/100 |
| 6,377,734 | B1 | * 4/2002 | Mayr et al. | 385/100 |
| 7,179,019 | B2 | * 2/2007 | Seto et al. | 405/183.5 |
| 2003/0015247 | A1 | * 1/2003 | Driver et al. | 138/98 |

FOREIGN PATENT DOCUMENTS

| | | |
|---|---|---|
| EP | 0 855 773 A1 | 7/1998 |
| EP | 0 942 504 A1 | 9/1999 |
| JP | 59-104607 A | 6/1984 |
| JP | 04-91611 A | 3/1992 |
| JP | 04-199105 A | 7/1992 |
| JP | 04-238302 A | 8/1992 |
| JP | 10-110868 A | 4/1998 |
| JP | 11-122774 A | 4/1999 |
| JP | 11-311369 A | 11/1999 |
| JP | 11-318016 A | 11/1999 |
| JP | 2000-291744 A | 10/2000 |
| JP | 2002-182087 A | 6/2002 |
| WO | WO 02/13345 A1 | 2/2002 |

* cited by examiner

Fig.4
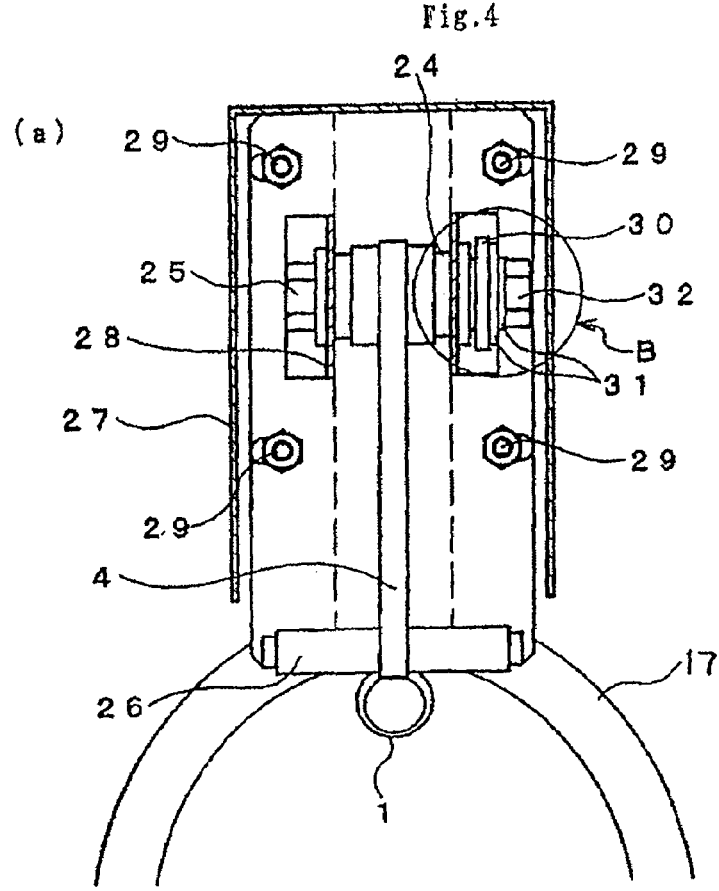
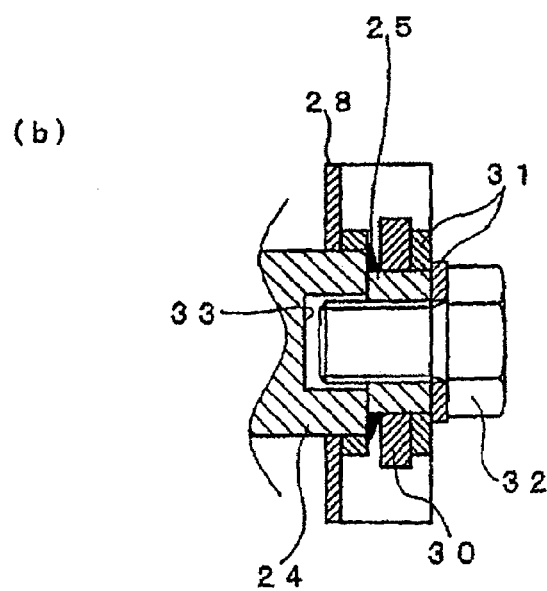

METHOD OF CONSTRUCTING INFORMATION CORRESPONDENCE PIPE, CONSTRUCTED STRUCTURE, AND CONSTRUCTION MEMBER

TECHNICAL FIELD

The present invention relates to a construction method of an information-communicable underground pipe for laying communication cables in an underground pipeline, and to a construction structure and construction member therefore.

BACKGROUND ART

In ongoing constructions of high-speed and ultra-high-speed communication networks, there are two laying methods for a communication cable which is a medium of such networks: an aerial scheme and underground scheme. The laying of communication cables by an underground scheme is characterized in that it can preserve space environments (appearance of the ground scenery) and is resistant to natural disasters such as earthquakes and typhoons compared to the laying by an aerial scheme. Among underground pipelines, a sewer pipe, in which a branch pipe (a lateral pipe) connecting to the main pipe has already been laid up to each household and the upper part inside the pipe is an open space, particularly has gained attention as an important infrastructure for the FTTH (Fiber To The Home) project in which communication cables are to be drawn to every household.

In order to utilize the open space in the upper part inside the main pipe of such sewer pipes, an information-communicable underground pipe, in which a sheath pipe into which communication cables can be inserted is attached to the upper part of the inner surface of the main pipe at a fixed spacing by means of a support device such as a saddle-type device, is buried in the ground and used as a communication infrastructure.

FIG. 29 is a sectional view of an example of a sewer pipe or the like which is buried in the ground as an information-communicable underground pipe. As shown in the figure, a sheath pipe 103 for inserting a communication cable 106 thereinto is attached to the inner surface of a regular pipe with a bracket 104 or the like, and used as a main pipe 105 of a sewer pipe or the like. To this main pipe 105, branch pipes (not shown), which are connected to each household, are connected. However, these branch pipes have not been constructed as an information-communicable underground pipe information-communicable underground pipe under present circumstances.

There is a disclosure described in JP, A, 11-311369 on an information-communicable underground pipe having a sheath pipe for inserting communication cables thereinto. In this information-communicable underground pipe, by using a sheath pipe support device consisting of: a support plate curved along the outer periphery of the sewer pipe so as to be supported by the upper part of the outer periphery of the sewer pipe; and a bracket having a ring-like shape into which the sheath pipe is passed through and which is attached to the inner side of the support plate so as to protrude into the upper part in the sewer pipe through a through hole provided in the sewer pipe, it is configured such that each bracket of the sheath pipe support device protrudes into the sewer pipe from each through hole which is provided in the upper part inside the sewer pipe at a proper spacing along the pipe axis direction, and the sheath pipe, which is attached in such a way that each through hole is water tightly covered with each support plate and is disposed along the pipe axis of the sewer pipe, is inserted into a bracket of each sheath pipe support device thereby being supported. Such configuration makes it possible to support a sheath pipe into which communication cables are inserted in the upper part inside the sewer pipe with a small occupying area. Moreover, since the sheath pipe is supported in the upper part in the sewer pipe, there is no risk that the flow capacity of sewage in the sewer pipe is reduced, and the workability at the installation site of the sewer pipe is significantly improved by attaching the sheath pipe to the sewer pipe in advance.

However, before the concept of the information-communicable underground pipe is created, an ordinary pipe without a sheath pipe was used as a sewer pipe or the like. Therefore, in the above described information-communicable underground pipe, it was necessary to attach the sheath pipe support device by digging up the upper part of the outer periphery of the sewer pipe buried in the ground to provide a through-hole therethrough. Also needed was an operation such as digging out a pipe having no sheath pipe to remove and replace it with an information-communicable underground pipe in which a sheath pipe is attached by means of a sheath pipe support device or a saddle-type device.

Thus, to convert a regular conduit having no sheath pipe into an information-communicable underground pipe, a very large scale operation was needed, and therefore there was a growing demand for converting a regular pipe having no sheath pipe into an information-communicable underground pipe by easily attaching a sheath pipe thereon.

Further, to lay communication cables up to each household through a branch pipe which is branched off from the main pipe of a sewer pipe, the laying path was too complicated and further the inner diameter of the branch pipe was too small and branched at various angles from the main pipe through a branch pipe opening. From these reasons, such laying is in reality not performed since there are technical difficulties compared with the case in which communication cables are laid in a straight fashion in the main pipe. Other technical difficulties in laying communication cables in a branch pipe exist in that the communication cable must be laid without impairing essential functions used as a lifeline, in that the communication cable must have water resistance, chemical resistance, anti-rat property, that is, resistance to breakages due to rat-bites, and anti-high-pressure-cleaning property, that is, resistance to high-pressure cleaning for checkup of the conduit.

DISCLOSURE OF THE INVENTION

In view of the above described situations, the object of the present invention is to provide a construction method of an information-communicable underground pipe which enables to turn an underground pipeline into an optimal information-communicable underground pipe, and also to provide the construction structure and construction members therefor.

The present invention relates to a construction method of an information-communicable underground pipe, characterized by comprising the steps of: inserting a sheath pipe into an underground pipeline through a manhole, the sheath pipe comprising a main body provided with an empty room for installing a communication cable thereinto, and a high-strength low-elongation material element which is integrally provided in said main body along the lengthwise direction of the main body; and fixing said sheath pipe in substantially upper part inside the underground pipeline by fixing said high-strength low-elongation material element onto the inner wall of said manhole by applying tension thereon.

The invention also relates to the construction method of said information-communicable underground pipe, wherein said underground pipeline consists of a main pipe and a branch pipe connected to the main pipe, characterized by further comprising, after fixing the sheath pipe in the substantially upper part inside said main pipe, the steps of: inserting a guide conduit into said main pipe, the guide conduit being formed with a fitting part with which the guide conduit can be fitted to said sheath pipe, and an empty room for inserting a branch communication cable thereinto, wherein a branch tension conduit to be inserted with said branch communication cable is branched off from the guide conduit, and the branch tension conduit is in communication with said empty room at the position corresponding to the connection portion between said branch pipe and said main pipe; and installing said guide conduit inside said main pipe by fitting said fitting part of said guide conduit to said sheath pipe, and installing said branch tension conduit inside said branch pipe.

The invention also relates to the construction method of said information-communicable underground pipe, wherein said underground pipeline consists of a main pipe and a branch pipe connected to the main pipe, characterized by further comprising, after the step of fixing the sheath pipe into said main pipe, the steps of: inserting a guide conduit into said main pipe, and the guide conduit being formed with an empty room for inserting a branch communication cable thereinto, wherein a branch tension conduit to be inserted with said branch communication cable is branched off from said guide conduit, and the branch tension conduit is in communication with said empty room at the position corresponding to the connection portion between said branch pipe and said main pipe; and installing said guide conduit on the inner surface of said main pipe in such a way as to surround said sheath pipe, and installing said branch tension conduit in said branch pipe.

The invention also relates to the construction method of said information-communicable underground pipe, characterized in that a high-strength low-elongation trunk tension member is inserted in said empty room in advance, and said method comprises, after the step of installing said guide conduit in said main pipe, the step of: urging said guide conduit toward the substantially upper part inside said main pipe by applying tension on said trunk tension member between manholes to each of which an end of said main pipe is connected respectively.

The invention also relates to the construction method of said information-communicable underground pipe, characterized in that a pre-inserted string is installed in advance to replace a communication cable in said empty room and said branch tension conduit, and said method further comprises the final step of replacing said pre-inserted string with a communication cable.

A construction structure of an information-communicable underground pipe, wherein an underground pipeline consists of a main pipe and a branch pipe connected to this main pipe, characterized in that: a sheath pipe is fixed in substantially upper part inside the underground pipeline by applying tension on a high-strength low-elongation material element, said sheath pipe comprising a main body formed with an empty room for installing a communication cable thereinto, and said high-strength low-elongation material element integrally formed in said main body along the length of said main body, and a guide conduit is installed in said main pipe by being fitted to the outside of said sheath pipe, the guide conduit being formed with an empty room for installing a branch communication cable thereinto.

The construction structure of said information-communicable underground pipe, characterized in that said sheath pipe is attached by means of a bracket which is provided on the inner wall of said main pipe at a certain spacing, and said guide conduit fitted to the outside of the sheath pipe is divided into a plurality of parts, which are integrated together by means of a connecting member which is provided in such a way to surround the outside of said bracket.

A structure of constructing an information-communicable underground pipe, wherein an underground pipeline consists of a main pipe and a branch pipe connected to the main pipe, characterized in that: a sheath pipe is fixed in substantially upper part inside the underground pipeline by applying tension on said high-strength low-elongation material element, wherein said sheath pipe comprises a main body formed with an empty room for installing a communication cable thereinto, and a high-strength low-elongation material element integrally formed in said main body along the length of said main body, a guide conduit is integrally installed in the inner wall of said main pipe surrounding said sheath pipe, the guide conduit being formed with an empty room for installing a branch communication cable thereinto, and a branch tension conduit is branched off from said branch pipe and installed in said branch pipe, wherein said branch tension conduit is in communication with said empty room at a position corresponding to a connecting part between said branch pipe and said main pipe and is installed with said branch communication cable.

The invention relates to the construction structure of said information-communicable underground pipe, characterized in that: a high-strength low-elongation trunk tension member is inserted in said empty room of said guide conduit; and said guide conduit is urged in the fitting direction by applying tension on said trunk tension member between manholes and said branch tension conduit is tensioned in said branch pipe so that said branch tension conduit is installed in the upper part inside said branch pipe.

A sheath pipe which is a member for constructing an information-communicable underground pipe, comprising a main body formed with an empty room for installing a communication cable thereinto, and a high-strength low-elongation material element integrally provided in said main body along the length of said main body.

A sheath pipe which a construction member of said information-communicable underground pipe, characterized in that said high-strength low-elongation material element is a textile in which a string having a high-strength low-elongation characteristics is used at least in the lengthwise direction.

A sheath pipe which is a construction member of said information-communicable underground pipe, characterized in that said high-strength low-elongation material element has an anti-corrosion coating.

A sheath pipe which is a construction member of said information-communicable underground pipe, characterized in that a fitting part is formed on the outer surface of said main body.

A sheath pipe used which is a construction member of said information-communicable underground pipe, characterized in that said high-strength low-elongation material element is longer than the length of said main body.

A guide conduit which is a construction member of an information-communicable underground pipe for use in further installing a communication cable in an underground pipeline in which a sheath pipe for installing communication cables thereinto is installed, characterized by comprising a fitting part for fitting the guide conduit to the outer surface of said sheath pipe, and an empty room formed inside the guide conduit to insert communication cables thereinto.

A guide conduit used which is a construction member of said information-communicable underground pipe, characterized in that; a plurality of layers are formed in said empty room by means of at least one or more partition plates to section said empty room vertically, and the height of each layer is configured to be smaller than twice of the outer diameter of a communication cable to be inserted in said empty room.

A guide conduit which is a construction member of an information-communicable underground pipe, the construction member for an information-communicable underground pipe being used for further inserting communication cables in an underground pipeline in which a sheath pipe for inserting communication cables thereinto is installed, characterized by: comprising a mounting part with which said guide conduit is integrally attached to the inner face of said underground pipeline in such a manner as surrounding said sheath pipe, and forming an empty room for inserting communication cables thereinto by being attached to said underground pipeline.

BRIEF DESCRIPTION OF THE DRAWINGS

FIG. 4 shows a tension device relating to the present embodiment, wherein (a) is a cross sectional view taken in 4-4 line in FIG. 3 and (b) is a schematic enlarged sectional view of part B in FIG. 4(*a*).

DESCRIPTION OF SYMBOLS

Figure 1:
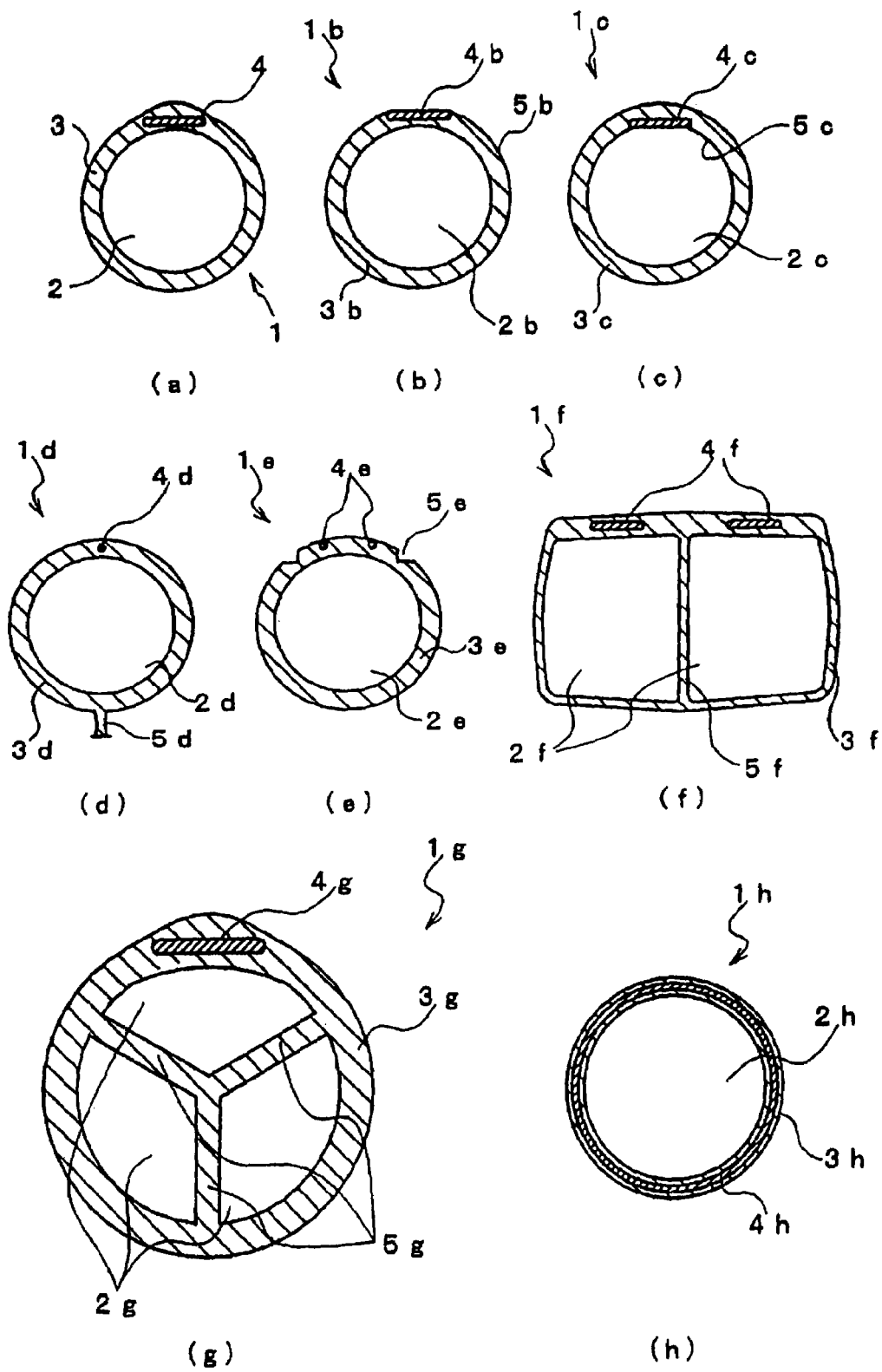
FIG. 1 is a sectional view of a sheath pipe which is a construction member of the information-communicable underground pipe according to the present invention, wherein (a) shows the present embodiment and (b) to (h) show other embodiments.

1 sheath pipe, 2 empty room, 3 main body,
4 high-strength low-elongation material element
6 communication cable (trunk communication cable),
7 branch pipe, 9, 10 manhole, 12 guide conduit, 14 empty room, 17 main pipe,
21 branch communication cable,
37 branch tension conduit, 43 branch sewage box,
103 sheath pipe, 105 main pipe,
106 trunk communication cable, 107 branch pipe,
112, 116, 124, 127, 131 guide conduit,
113, 117, 126 fitting part
114, 118, 125, 130, 135 empty room,
121 branch communication cable
137 branch tension conduit, 138 branch pipe opening,
139, 155 opening part, 140, 154 branch member
141, 156 branch part.

BEST MODE FOR CARRYING OUT THE INVENTION

The embodiments of the present invention will be described referring to FIGS. 1 to 12. In the following description, although it is assumed that the underground pipeline is a sewer pipe, the underground pipeline in the present invention is not limited to sewer pipes, but may be any underground pipeline such as a gas conduit using a steel pipe, a water supply pipeline made of a cast iron pipe, a storm water pipe, a power cable pipe, and the like as long as they are buried under the ground. Moreover, when there is no manhole provided in a section of underground pipeline, a pit may be formed to carry out the present invention.

First, the configuration of an underground pipeline will be explained referring to FIG. 10. The numeral 17 in FIG. 10 denotes a main pipe of a sewer pipe which is installed between manholes 9, 10 such as a pit. And, the underground pipeline is configured such that a branch pipe 7 is branched off at a branch pipe opening 38 from the upper side of the main pipe 17, and said branch pipe 7 is connected to a branch sewage box 43 which is an end part of a branch pipe 7 of each household 8.

Generally, a main pipe 17 is installed at a depth of several meters along the road, and a branch pipe opening 38 is formed on a slantingly upward part of the main pipe 17, while the branch pipe 7 is connected to the branch sewage box 43 from the branch pipe opening 38.

Figure 2:
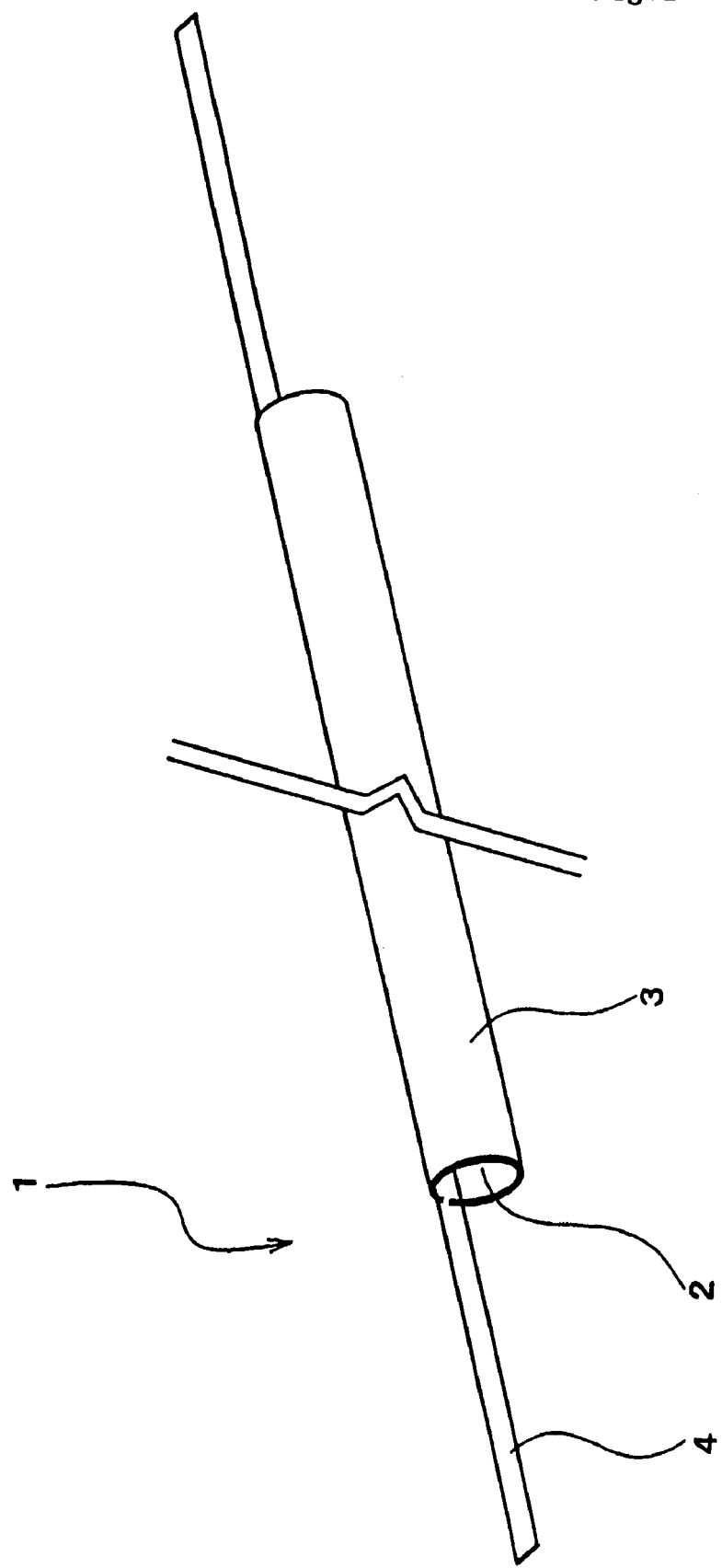
FIG. 2 is a perspective view of the sheath pipe of the present embodiment.

Next, the sheath pipe to be used for constructing an information-communicable underground pipe will be explained. FIG. 2 is a perspective view of a sheath pipe of the present embodiment. This sheath pipe 1 consists of a main body 3 having an empty room 2 into which a communication cable 6 can be installed, and a high-strength low-elongation material element 4 which is integrally provided in the main body 3 along the length of the main body 3. It is configured such that the main body 3 of the sheath pipe 1 has a substantially same length as that of the main pipe 17, and the high-strength low-elongation material element 4 has a length larger than that of the main body 3.

Further, the sectional view of the sheath pipe of FIG. 1(a) corresponds to the above described sheath pipe 1 and, as shown in FIG. 1, a high-strength low-elongation material element 4 consisting of a belt-like textile is integrally buried in the wall thickness of the cylindrical main body 3. This buried high-strength low-elongation material element 4 may alternatively consist of a string or a rope-like textile.

Moreover, FIGS. 1(b) to 1(h) show sectional views of other embodiments of the sheath pipe, indicating that not only the sheath pipe 1 of FIG. 1(a) but also other sheath pipes to be described below can equally be applied. The sheath pipes 1b, 1c shown in FIGS. 1(b), 1(c) are configured such that the high-strength low-elongation material element 4b, 4c is integrally formed along the length of the main body 3b, 3c in the outer periphery 5b or inner periphery 5c of the cylindrical main body 3a, 3b having an empty room 2b, 2c into which communication cable 6 may be inserted. In these cases, the high-strength low-elongation material element 4b, 4c may be a belt-like textile. It is also possible to integrate the high-strength low-elongation material element 4b, 4c with the main body 4b, 4c by use of an adhesive and the like.

The sheath pipe 1d, 1e shown in FIGS. 1(d), 1(e) is formed with a fitting part consisting of a convex projection part 5d or a concave groove 5e formed on the outer periphery of the cylindrical main body 3d, 3e having an empty room 2d, 2e into which communication cable 6 may be inserted, and the high-strength low-elongation material element 4d, 4e is integrally buried in the wall thickness of the main body 3d, 3e along the length of the main body 3d, 3e. The high-strength low-elongation material element 4d, 4e in these cases may consist of a string or rope-like textile. Moreover, providing a fitting part on the outer periphery of the sheath pipe 1d, 1e makes it possible to fit various types of guide conduits onto the sheath pipe 1d, 1e. For example, a guide conduit, into which a branch communication cable having a specified number of cores can be installed depending on the installation site, can be attached by fitting it to the sheath pipe 1d, 1e.

The sheath pipe 1f shown in FIG. 1(f) has a rectangular tube-like main body 3f having empty rooms 2f sectioned by a partition plate 5f at the central part and capable of being inserted with the communication cable 6. Also the high-strength low-elongation material element 4f is integrally buried in the upper wall thickness of each empty room 2f along the length of the main body 3f. The high-strength low-elongation material element 4f in these cases may consist of a string or, a belt-like or rope-like textile. The formation of multiple number of empty rooms 2f enables the insertion of a large number of communication cables.

The sheath pipe 1g shown in FIG. 1(g) consists of a cylindrical main body 3g formed with partition plates 5g extending from the center to the inner wall and having an empty room 2g into which communication cable 6 can be inserted, and a high-strength low-elongation material element 4g is integrally buried in the wall thickness of the main body 3g along its length. The high-strength low-elongation material element 4g in this case may consist of a string or, a belt-like or rope-like textile. Since this sheath pipe 1g also has multiple empty rooms 2g as with the above described sheath pipe 1f, it is possible to insert a large number of communication cables thereinto.

The sheath pipe 1h shown in FIG. 1(h) consists of a cylindrical main body 3h having an empty room 2h into which communication cable 6 can be inserted, and a high-strength low-elongation material element 4h consisting of a tube-like textile is integrally buried in the wall thickness in the circumferential direction along the length of the main body. The high-strength low-elongation material element 4h of this case consists of a tube-like textile, and the configuration to bury it in the circumferential direction of the main body 3h as shown in FIG. 1(h) will make the main body 3h as a whole insusceptible to deformation and increase the strength of the main body 3h thereby protecting communication cables 6 to be inserted into the empty room 2h.

As described so far, the cross section of the sheath pipe may have various shapes, and there is no specific limitation on them provided that a high-strength low-elongation material element is integrated with the main body having an empty room, into which a communication cable can be inserted, along its length. The main bodies of the above described sheath pipes all have a substantially same length as that of the main pipe in which the sheath pipe is to be installed.

Since the above described sheath pipes have a main body integrated with a high-strength low-elongation material element, they would not be elongated thereby becoming loose even if the main body is made of a ductile material such as low density polyethylene and the like.

For the high-strength low-elongation material element, it is possible to apply metal wires or strings made of high-strength low-elongation materials called as super fibers, and textiles in which such a string is used in the lengthwise direction. The general definition of the super fiber refers to a fiber which has a strength of not lower than 2 Gpa and an elastic modulus of not lower than 50 Gpa. The kind of such fibers includes glass fiber, para-alamido fiber, carbon fiber, steel fiber, ultra-strength polyethylene fiber, PBO(poly-p-phenylene benzo-bis-oxazole) fiber, polyarylate fiber, and the like, and any of these is applicable.

When the string used as the high-strength low-elongation material element lacks anti-chemical property depending on the application, it is preferable to apply an anti-corrosion coating on the high-strength low-elongation material element and, thereafter, integrate it with the main body of the sheath pipe. Although typical anti-corrosion coatings include polyethylene and polypropylene, other materials may be used which have an anti-corrosion property and are suitable for the type of the pipe to be used. Also, when lacking wear resistance and/or anti-cut property, forming an anti-corrosion coating such as polyethylene, polypropylene, and the like makes it possible to select a most cost-effective string having a high-strength low elongation property out of wide variety of kinds.

Moreover various forms of textiles such as fabrics, knits, braids, or a belt-like member or rope-like member comprised of a non-woven textile may be used as the textile, but it needs to be configured such that at least a string made of a high-strength low-elongation fiber is disposed in a substantially straight line in the lengthwise direction of the main body so that effects of the high-strength low elongation characteristics of the string can be exerted. For example, in the case of a fabric, it is advisable to reduce elongation due to structural reasons by using a thin string for the weft to restrict the waviness of the high-strength low-elongation fiber string used as the warp to a minimum level.

The high-strength low-elongation material element described so far may be integrated with the main body by burying or bonding it in or to the main body of the sheath pipe. Moreover, when drawing in the sheath pipe, of which main body is integrated with the high-strength low-elongation material element, into a main pipe for installation, it is possible to install the sheath pipe properly in the main pipe 17 since the high-strength low-elongation material element will not be twisted against the main body. In the present embodiment to be described below, an example of fabrication method of the sheath pipe 1 will be shown, but it will not limit the invention.

For the high-strength low-elongation material element 4 to be integrated with the body part 3 of the sheath pipe 1, a plain-woven belt-like textile having a width of 17 mm and a thickness of 1.8 mm was used, which consisted of a warp (lengthwise direction of the main body) having ten strands, each of which is twisted with seven 1500 d yarns of polyarylate fiber filaments, and a weft of one strand, which is twisted with a 500 d yarn of polyester filaments 137 times/100 mm. Using this textile will make the handling easy and damages less likely to occur during manufacturing and operation in a pipe.

The above described polyarylate fibers have good chemical resistance properties such as acid-resistance and water-resistance properties as well as a good creep characteristics, and is therefore most suitable for use in applications in an environment like a sewer pipe in which a constant load is applied. Moreover, since they have a good wear resistance and a cut-proof property, they are insusceptible to damages and therefore to deterioration in strength when attaching them to the tension mechanism by bending them over the range from the main pipe 17 to the manhole 9, 10.

Next, the main body 3 of the sheath pipe 1 was made of a low density polyethylene of a density of 0.919. The sheath pipe 1, in which the cylindrical main body 3 having an outer diameter of 34 mm and an inner diameter of 28 mm (see FIG. 1(a)) was integrated with the high-strength low-elongation material element 4, was manufactured by: forming a slit in the inner lip used for pipe forming for the main body 3, withdrawing the high-strength low-elongation material element 4 from the slit thereby placing it between the inner and outer lips, and extruding them. Thus, it is possible to manufacture the sheath pipe with ease and at low cost.

The construction structure for converting an underground pipeline into an information-communicable underground pipe will be explained referring to the sheath pipe 1 out of those described above; however, the invention will not be limited thereby.

Figure 10:
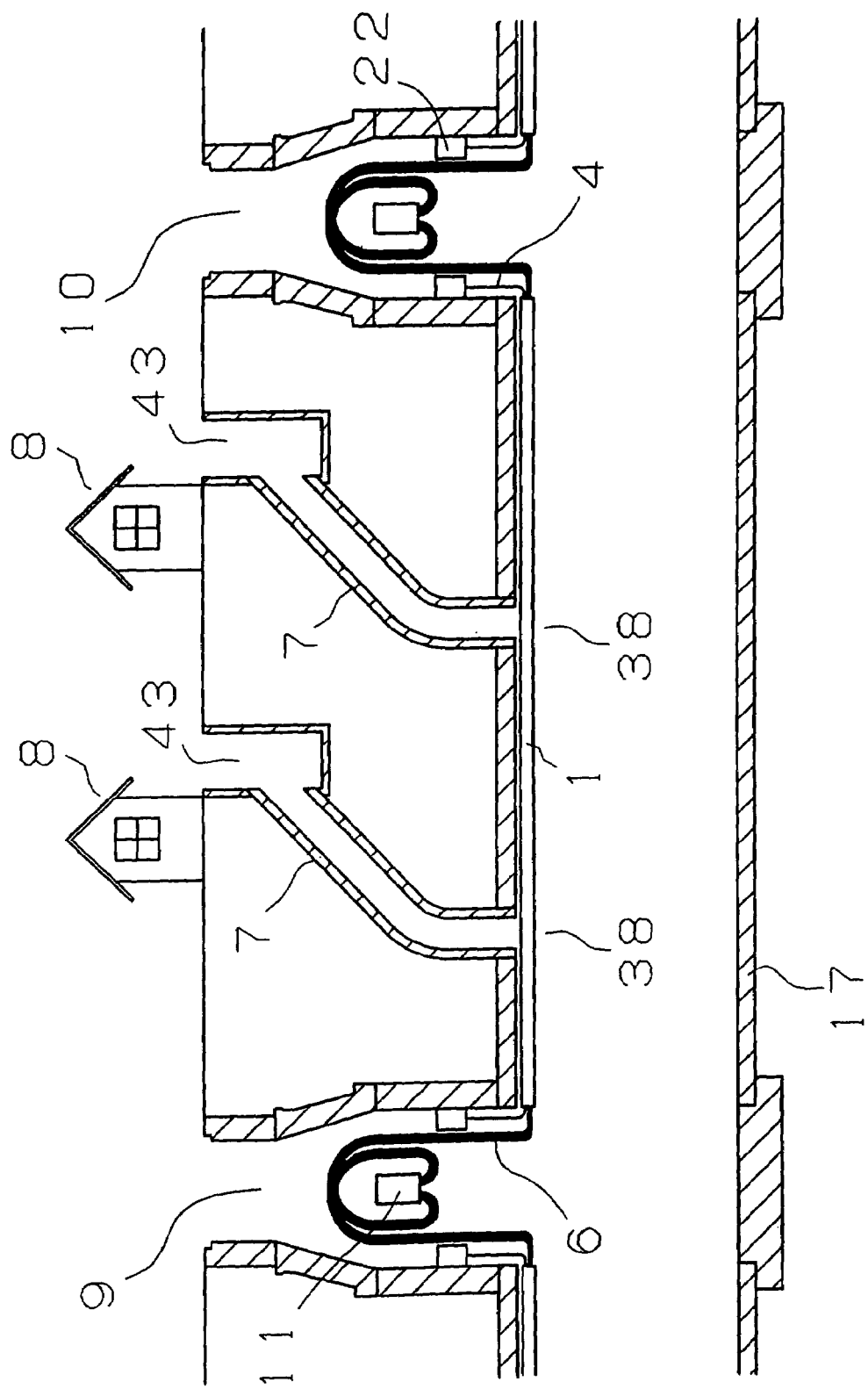
FIG. 10 is a diagram to show the construction structure relating to the present embodiment for making an underground pipeline into an information-communicable underground pipe.

FIG. 10 shows the construction structure to make an underground pipeline into an information-communicable underground pipe according to the present embodiment. The information-communicable underground pipe construction structure of the main pipe 17 of an underground pipeline shown in FIG. 10 is constructed by: inserting the sheath pipe 1 into the main pipe 17 through manhole 9, 10 as shown in FIG. 10, the sheath pipe 1 comprising a main body 3 formed with an empty room 2 into which communication cables 6 can be inserted and a high-strength low-elongation material element 4 integrally formed in the main body 3 along the length of the main body 3, and then applying tension on the high-strength low-elongation material element 4 by a tension mechanism 22 mounted in the inner wall of the manhole 9, 10 to fix it in substantially upper part inside the main pipe 17. The main pipes 17 are connected through manholes 9, 10 such as a pit, and a branch connection box 11 is provided in a manhole 9 or the like, and the communication cables 6 (hereinafter, also called as "trunk communication cable") inserted in the sheath pipe 1, which is installed in substantially upper part inside the main pipe 17, are connected with one another at this branch connection box 11.

Thus, since the high-strength low-elongation material element 4 of the sheath pipe 1 is longer than the length of the main body 3, it is possible to wind the high-strength low-elongation material element 4 into the tension device 22 provided in the manhole 9, 10 and further apply tension on the high-strength low-elongation material element 4 thereby fixing the sheath pipe in substantially upper part inside the main pipe 17. It is also possible to make the tension mechanism and the structure at the ends of the sheath pipe simpler than in the case in which the sheath pipe is installed in an existing conduit by applying tension on the sheath pipe itself.

Figure 3:
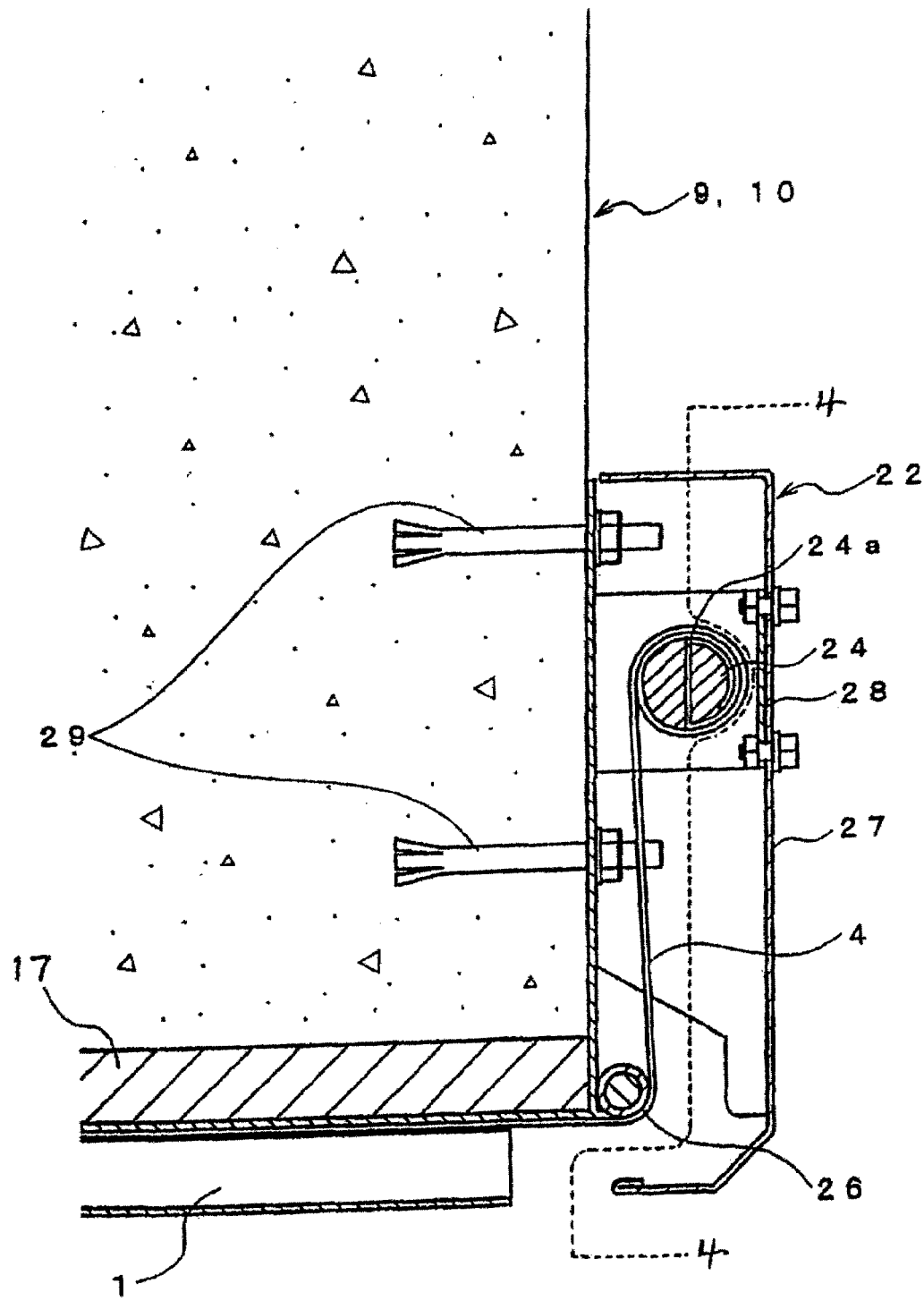
FIG. 3 is a schematic diagram of the tension device relating to the present embodiment.

Next, the tension device 22 for fixing the sheath pipe 1 in the substantially upper part inside the main pipe 17 will be explained referring to FIGS. 4(a) and (b). The tension device 22 is installed in the inner wall of the manhole 9, 10 as shown in FIG. 3, FIGS. 4(a) and 4(b). This tension device is fixed with an anchor bolt at the position where the sheath pipe 1 is installed in the substantially upper part in the main pipe 17. A winding drum 24 for winding and fixing the high-strength low-elongation material element 4 is held with a bracket 28 in the tension device 22. A concave part 33 is formed in each end of this winding drum 24 so that the tip of the bolt 32 will not come into contact with it, and a nut 25 is attached to each end face by welding. Further, a stopper 30 having a through hole which conforms to the nut 25 is fitted to the nut 25 thereby prohibiting the nut 25 to rotate and thus, the stopper 30 is prevented from falling out with a bolt 32 via a washer 31.

When winding the high-strength low-elongation material element 4 on the winding drum 24 at the manhole 9, the sheath pipe 1 is fixed by dismounting a bolt 32 and stopper 32 attached to the nut 25 of one end of the winding drum 24, inserting the high-strength low-elongation material element 4 made of a belt-like textile into the hole part 24a passing the central axis of the winding drum 24 as shown in FIG. 3, folding back the end part of the high-strength low-elongation material element 4 in the winding direction of the high-strength low-elongation material element 4 to be rolled in the winding drum 24 it to the vicinity of the entrance of the hole part 24a, thereafter rotating the winding drum 24 in the direction to wind the high-strength low-elongation material element 4 on the tension device 22 so that the end of the sheath pipe 1 is placed in a predetermined location, fitting the detached stopper 30 into the nut 25 and fixing it by tightening the bolt 32 so that the winding drum 24 will not rotate.

Similarly, by setting the high-strength low-elongation material element 4 in the tension device 22 installed in the manhole 10, winding the high-strength low-elongation material element 4 on the winding drum 24, and fixing the winding drum not to rotate, it is possible to fix the sheath pipe 1 in the substantially upper part inside the main pipe 17 with the high-strength low-elongation material element 4 being subject to tension.

Further, as shown in FIG. 3 and FIG. 4(a), a receiving roller 26 is attached to the tension device 22 at the bending part of the high-strength low-elongation material element 4 locating between the sheath pipe 1 and the tension device 22. Attaching the receiving roller 26 in this way will prevent the breakage of the high-strength low-elongation material element 4 caused by being rubbed by the end part of the main pipe 17 when tension is applied on the high-strength low-elongation material element 4. Moreover, a cover 27 is attached to the tension device 22 to protect the high-strength low-elongation material element 4 while tension is applied thereon.

Thus, it is made possible to attach a sheath pipe 1, of which main body 3 is integrated with the high-strength low-elongation material element 4, in the main pipe 17 with ease, to construct an information-communicable underground pipe, and thus it is possible to insert the trunk communication cable 6 into the sheath pipe 1.

So far, the construction structure of an information-communicable underground pipe has been explained in which a sheath pipe 1 is installed in a main pipe of an underground pipeline, and a trunk communication cable 6 is inserted into the sheath pipe 1. Next, explanation will be given on a construction structure for forming an underground pipeline as a whole into an information-communicable underground pipe by laying a branch communication cable 21 up to a branch sewage box located at an end of a branch pipe 7 which branches off from the main pipe 17.

Figure 11:
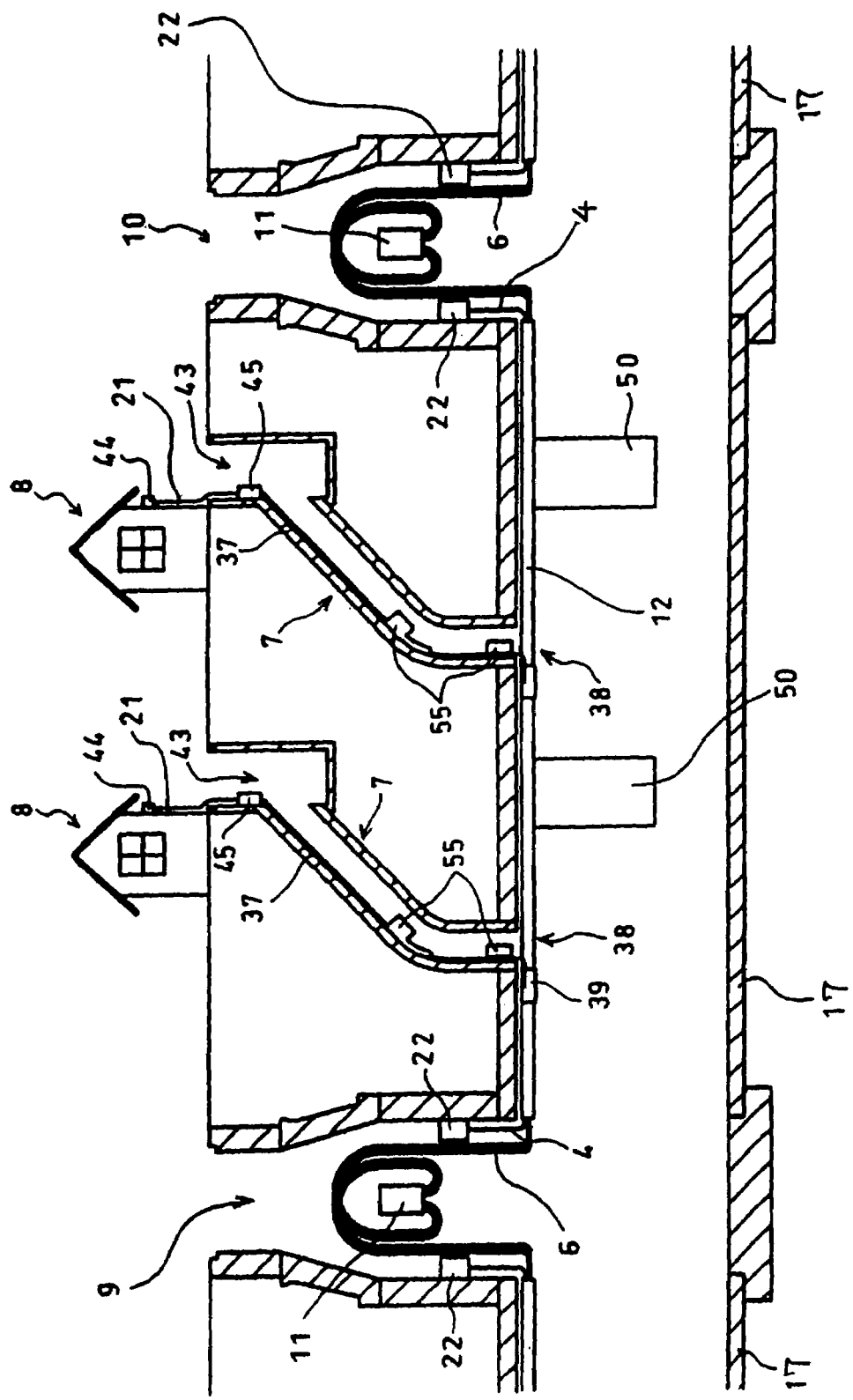
FIG. 11 is a diagram to show the construction structure relating to the present embodiment for making an underground pipeline into an information-communicable underground pipe.

In an underground pipeline in which a branch pipe 7 connects to a main pipe 17 as shown in FIG. 11, the entire underground pipeline including a branch pipe 7 is constructed as an information-communicable underground pipe by: fitting a guide conduit 12 in which a branch tension conduit 37 is installed, to a sheath pipe 1 installed in the substantially upper part inside the main pipe 17; installing the branch tension conduit 37 in the branch pipe 7 connected to the main pipe 17 and leading to each household; and installing a branch communication cable 21 up to a branch sewage box 43 located at an end of branch pipe 7.

Figure 5:
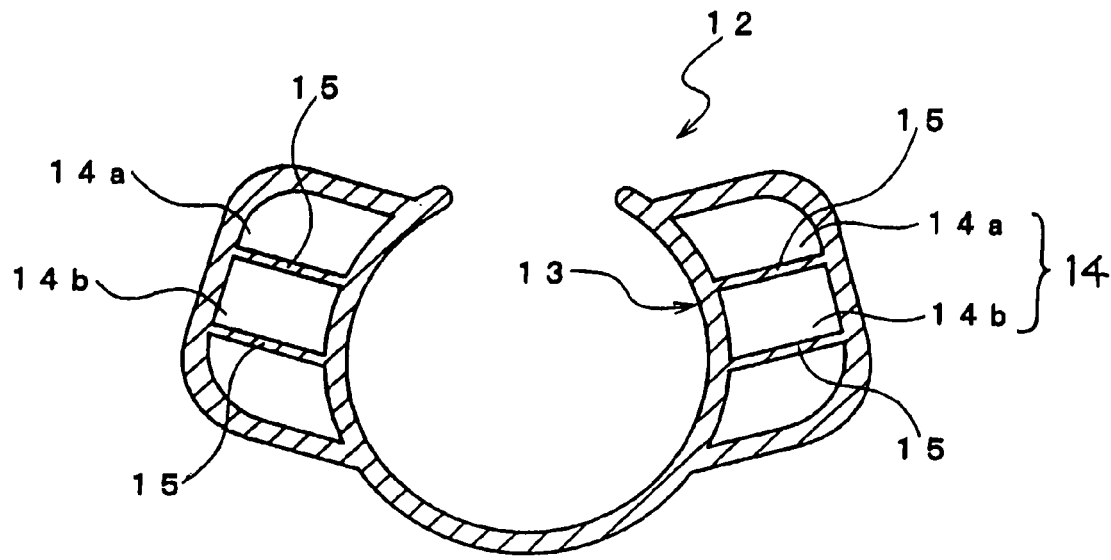
FIG. 5 is a schematic sectional view of the guide conduit relating to the present embodiment.

The guide conduit 12 shown in FIG. 5 represents a state before it is fitted to the sheath pipe 1, and the shape shown in FIG. 5 is especially suitable to the present embodiment in which the guide conduit 12 is formed with its fitting part 13 narrowed to enhance the fitting force of the guide conduit 12 against the sheath pipe 1. The guide conduit 12 is preferably made of plastic such as polyethylene from the viewpoint of weight and chemical resistance, but other kinds of materials may be chosen depending on the kind of the underground pipeline.

Further, the guide conduit 12 shown in FIG. 5 is also used to insert further communication cables in the main pipe 17. The guide conduit 12 has a length along the sheath pipe 1, and is formed with a fitting part 13 with which the guide conduit is fitted in its length wise direction to the outer face of the sheath pipe 1, and an empty room 14 into which branch communication cables 21 (referring to generally called "drop cable") are installed. The empty room 14 is formed surrounding the fitting part 13 and is sectioned vertically by a partition plate 15 to form multiple layers (14a, 14b, . . . ), and branch communication cable 21 is inserted into each layer (14a, 14b, . . . ). Further, it is preferable to have a pre-inserted string 41 inserted in advance for replacing the branch communication cable 21 when installing the guide conduit 21 in the main pipe 17 as will be described later.

Figure 6:
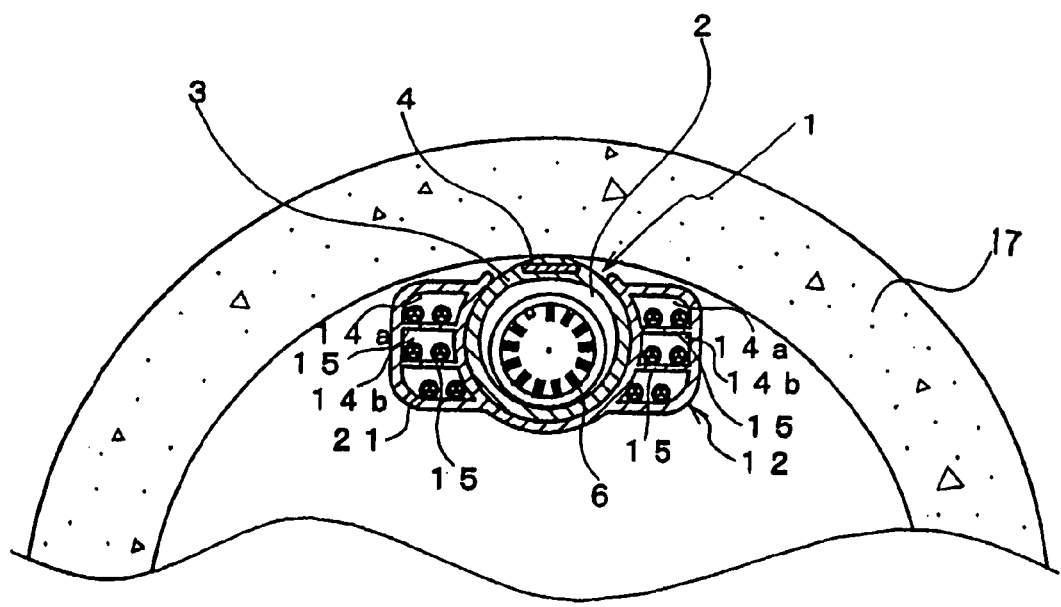
FIG. 6 is an explanatory diagram to show the state in which a guide conduit is fitted to a sheath pipe relating to the present embodiment.

FIG. 6 is an explanatory diagram to show a state that a guide conduit is fitted to a sheath pipe according to the present embodiment. The sheath pipe 1 is installed in the substantially upper part inside the main pipe 17 and is inserted with a trunk communication cable 6 in its inside. The guide conduit 12 having a fitting part 13 is fitted to the outside of the sheath pipe 1. The guide conduit 12 is made of plastic such as polyethylene, and can be fitted with ease to the outer face of the sheath pipe 1, since the fitting part 13 elastically recovers quickly after being deformed in a bending manner. Since the structure is configured such that the weights of sheath pipe 1, guide conduit 12, and others to be installed in the underground pipeline are borne by the high-strength low-elongation material element 4 integrated into the main body 3 of the sheath pipe 1, there is no need to reinforce other members.

The branch communication cable 21 inserted in the above described guide conduit 12 is a communication cable which is branched off from the trunk communication cable 6 at a branch connection box 11 installed at a manhole 9 or the like, and is to be laid up to each household 8 as will be described later. This branch communication cable 21 is branched off from the trunk communication cable 6 in a necessary number corresponding to the number of households 8 which require the installation.

Further, the empty room of the guide conduit 12 is sectioned so that the height of each layer is smaller than twice of the outer diameter of the branch communication cable 21 so that each branch communication cable 21 will not get over an adjacent branch communication cable 21 and the arrangement will remain unchanged in each layer even if multiple branch communication cables 21 are inserted. Thus, the branch communication cable 21 is prevented from being entangled or incorrectly connected to each household.

Figure 8:
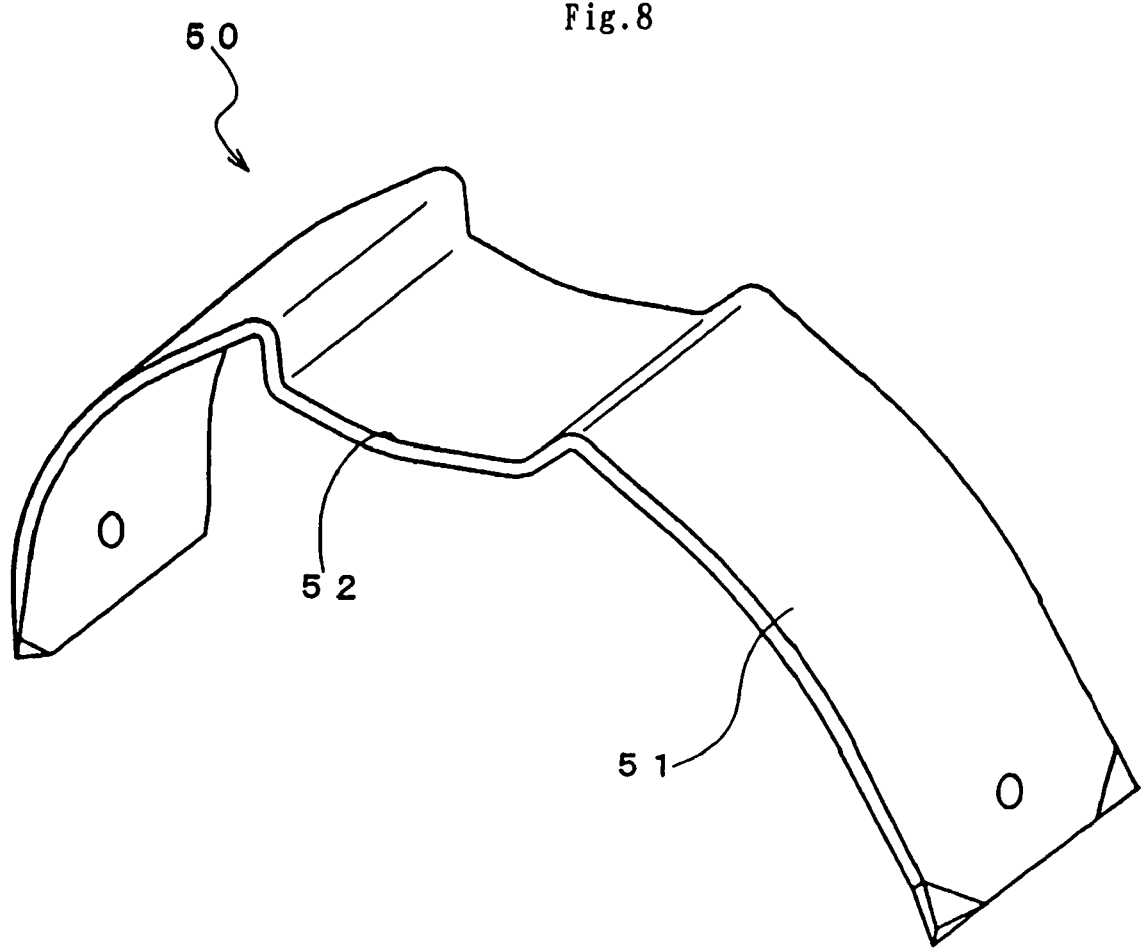
FIG. 8 is a perspective view of a sagging-prevention member used in the construction structure and construction method of the information-communicable underground pipe relating to the present embodiment.

It is possible to assistively prevent the sagging of the guide conduit 12 in the radially inward direction by placing a plurality of sagging-prevention members 50 consisting of a substantially C-shaped fixing part 51 having a concave part 52 in its central portion as shown in FIG. 8 placed at a proper spacing in the main pipe 17 as shown in FIG. 11 after installing the guide conduit 12 so far described by fitting it to the sheath pipe 1. It is also possible to prevent the guide conduit 12 from being detached from the sheath pipe 1 during a high-pressure washing in the maintenance operation. The substantially C-shaped fixing part 51 of the sagging-prevention member 50 is fixed on the inner wall of the main pipe 17 while retaining the guide conduit 12 in its concave part 52.

Figure 7:
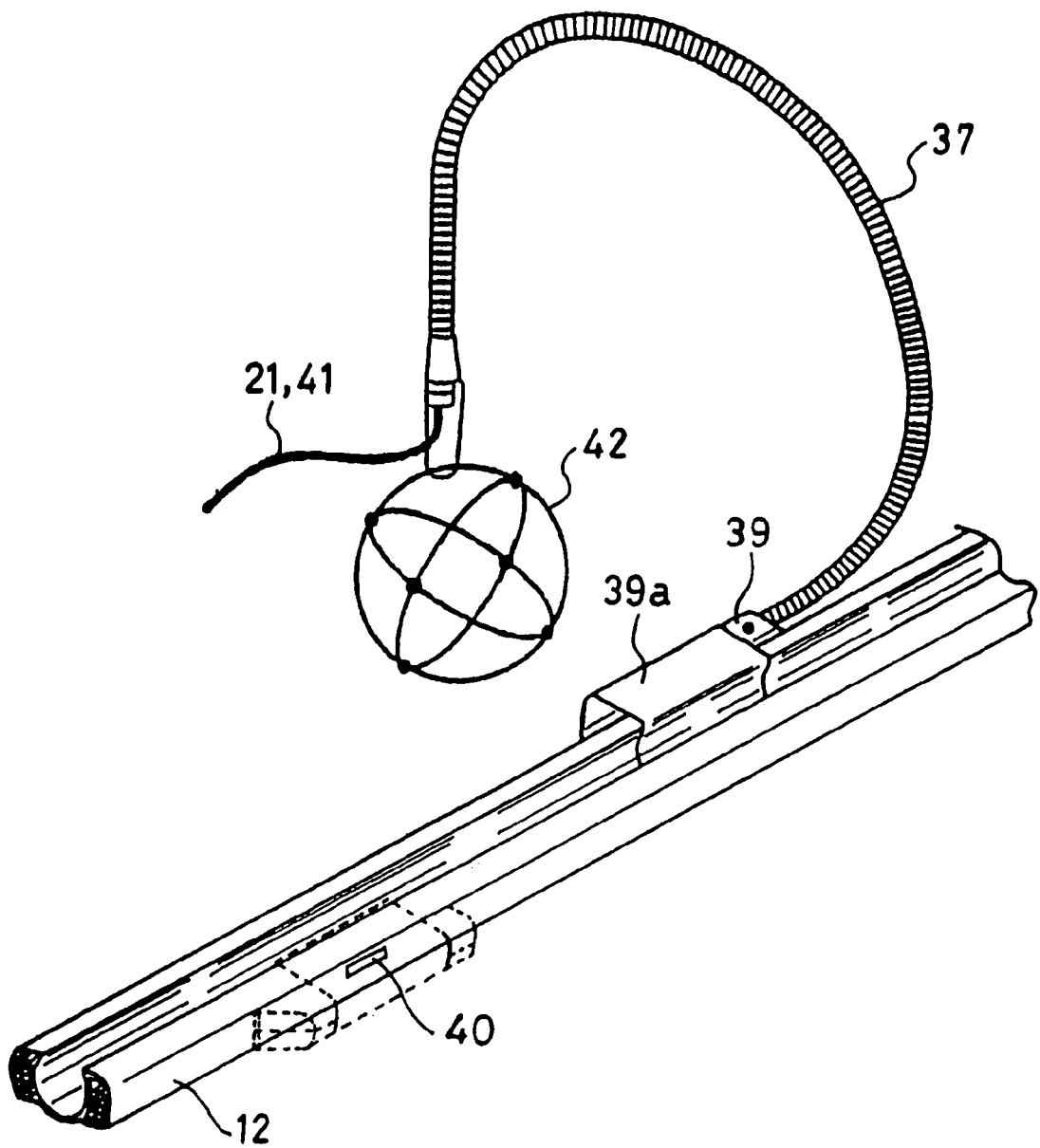
FIG. 7 is a perspective view of a guide conduit provided with a branch tension conduit relating to the present embodiment.

Next, the branch tension conduit 37 is attached to the guide conduit 12 through a branch member 39 as shown in FIG. 7. This branch member 39 is fixedly held by a branch-fixing member 39*a* which is fitted to the outer face of the guide conduit 12. Further, the guide conduit 12 is formed, at a portion where the branch member 39 is provided, with an opening part 40 for taking out the branch communication cable 21 and a pre-inserted string 41 from the guide conduit 12. The position of the guide conduit 12 at which the branch member 39 is provided is chosen to be near a branch pipe opening 38 at which the branch pipe 7 connects to the main pipe 17. The branch tension conduit 37 is attached to such branch member 39 as shown in FIG. 7, and the branch communication cable 21 or pre-inserted string 41 inserted in the empty room 14 of the guide conduit 12 is inserted into the branch tension conduit 37 from the branch pipe 7 through the branch member 39.

The above described branch communication cable 21, which is preferably used in the present embodiment, is a cable having a diameter of about 5 mm, in which four optical fiber cores are inserted in a stainless pipe, and of which outer face is coated with polyethylene. Moreover, as the pre-inserted string 41, one comprised of a tube or a string made of urethane and having substantially the same diameter with that of the branch communication cable is preferably used. For the branch communication cable, cables other than four core types, for example two core types and other types may be utilized.

Further, branch tension conduit 37 may be a flexible pipe made of stainless steel or plastic, and is finally inserted with a branch communication cable 21. This branch tension conduit 37 plays a role in protecting the branch communication cable 21 from the outside preventing its damages and deterioration, and installing the branch communication cable 21 in the branch pipe 7 by being tensioned as will be described below. For this branch tension conduit 37, one having an allowable bending radius larger than that of the branch communication cable 21 is chosen so as not to be bent to an extent of a bending radius smaller than the minimum bending radius (allowable bending radius) of the branch communication cable 21 to be inserted thereinto. This is to prevent the branch communication cable 21 inserted inside the branch tension conduit 37 from being bent exceeding its allowable bending radius and thereby being broken.

The branch tension conduit 37 inserted with the branch communication cable 21 is arranged as far as the branch sewage box 43 at the end of the branch pipe 7 along the upper part inside the branch pipe 7. There is provided a tension mechanism 45, into and with which the branch tension conduit can be inserted and is tightened up, in the branch sewage box 43, and the branch tension conduit is being tensioned by this tension mechanism 45.

Figure 9:
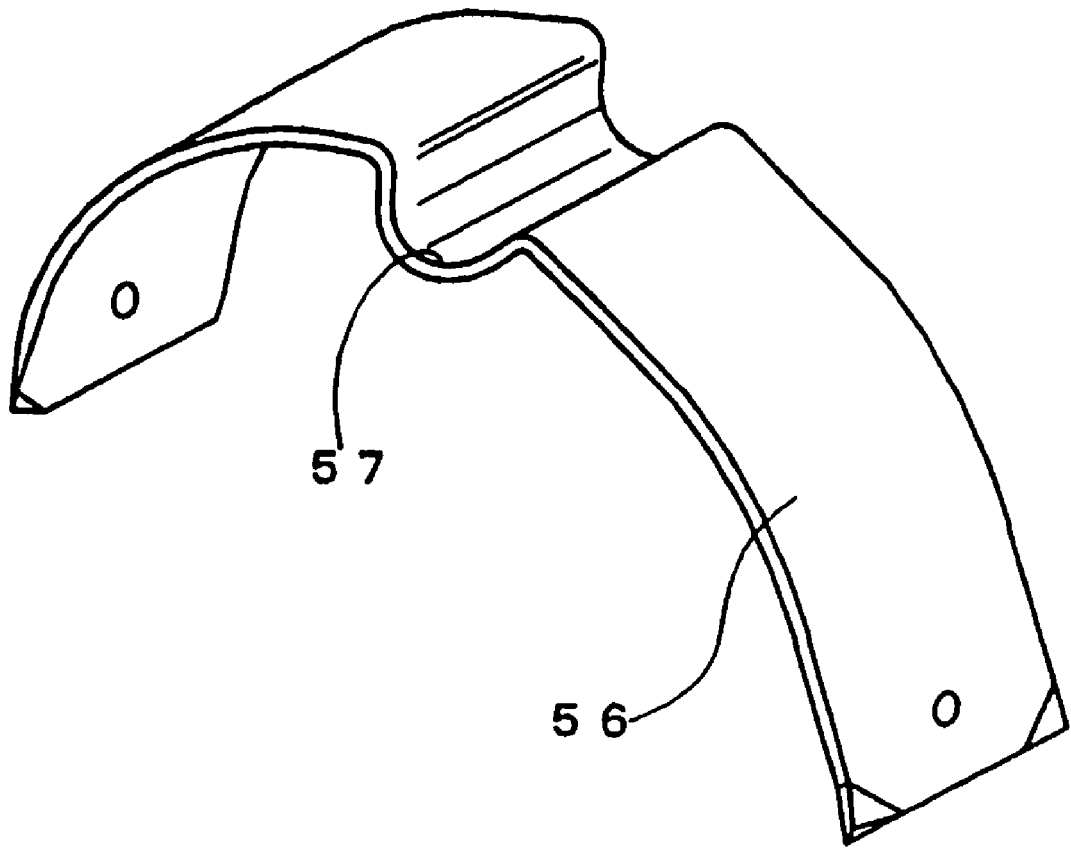
FIG. 9 is a perspective view of a conduit-fixing member used in the construction structure or the construction method of the information-communicable underground pipe relating to the present embodiment.

Further, to secure the branch tension conduit 37 to the upper part inside the branch pipe 12, it is desirable to use, for example, a conduit-fixing member 55 consisting of a substantially C-shaped fixing part 56 having a concave part 57 in its central portion as shown in FIG. 9. Using such conduit-fixing member 55 or the like will make the branch tension conduit 37 on which tension is applied be securely installed in the upper part inside the branch pipe 7 (see FIG. 11). Thus, installing the branch tension conduit 37 in the upper part inside the branch pipe 7 makes it possible to prevent the branch tension conduit 37 from blocking the sewerage flow and thereby impairing the function as a lifeline, or from being bitten by rats thereby resulting in a breakage.

Moreover, arranging the branch tension conduit 43 in the upper part inside the branch pipe 7 as described above will cause the branch communication cable 21 to be installed from the guide conduit 12 to the branch sewage box 43. The branch sewage box 43 has an opening near each household 8, and the branch communication cable 21 guided to the branch sewage box 43 is drawn out on the ground and thereafter is drawn into a cable-termination box 44 installed in each household 8.

As described so far, the branch communication cable 21 is first installed in the guide conduit 12, and then a branch communication cable 21 corresponding to each household 8 is installed in a branch pipe 7 leading to a branch sewage box 43 corresponding to each household 8 with the branch communication cable being protected by the branch tension conduit 37.

According to this structure, a structure is achieved to construct an underground pipeline, which consists of a main pipe 17, which is an information-communicable underground pipe, and a branch pipe 7 connected to the main pipe, as an information-communicable underground pipe as a whole, and also a structure is realized which allows the branch communication cable 21 to be installed with ease in the branch pipe 7. Further, according to this structure, the branch communication cable 21 is installed in the branch pipe 7 in a state of being inserted into a branch tension conduit 37 and, therefore, the branch pipe 7 can be constructed as an information-communicable underground pipe even if the installation path of the branch communication cable 21 is complicated. It is also made possible to satisfy other requirements such as that there is no limit on the connecting angle of the branch pipe 7 to the main pipe 17, that the branch pipe does not impair the functions as an infrastructure, and that the structure has the functions of water proof, chemical resistance, anti-rat property, anti-high-pressure-cleaning property, and the like.

Moreover, at the tip of the branch tension conduit 37, there is provided a member 42 called as a "Hock-end" as shown in FIG. 7 for withdrawing the branch tension conduit 37 from the inside of the main pipe 27 through the branch sewage box 43 located at the end of the branch pipe 7. This Hock-end 42 has a structure like a hollow sphere having a diameter of about 80% of the inner diameter of the branch pipe 7, but it is not limited to that structure and may have other shapes such as a ring and the like provided that it can be hooked or grabbed. It is also possible to hook the branch tension conduit 37 directly.

Further, to prevent the entanglement of multiple branch communication cables in a guide conduit 12, it is desirable that the position arrangement of the branch communication cable 21 in the guide conduit 12 follows an orderly arrangement rule associated with the position of the branch pipe 7 extending to each household 8. That is, it is desirable to follow such a arrangement rule as that the branch communication cables 21 are placed parallel with one another in the widthwise direction so that the branch communication cable located at the outer-most position can be taken out from the manhole 9 toward the inside of the main pipe 17 (see FIG. 11). Moreover, it is also desirable to apply such arrangement rule for the case in which a pre-inserted string 41 is inserted in place of the communication cable 21.

Next, the construction method of an information-communicable underground pipe according to the present invention will be described omitting overlaps in the explanation with the above described construction structure of an information-communicable underground pipe.

First, the distance between manholes 9, 10, the distance from the manhole 9 to the branch sewage box 38 of each branch pipe 7 in the main pipe 7, the depth of the branch sewage box 43, and the like are precisely measured (see FIG. 11) in the underground pipeline, which is to be constructed as an information-communicable underground pipe by laying branch communication cables 21, by using a TV camera or the like.

Based on the data acquired from the survey of the underground pipeline as described above, the lengths of the sheath pipe 1 and the guide conduit 12, the position to attach the branch member 39, and the length of branch tension conduit 37 are determined, and those except sheath pipe 1 are preassembled. Furthermore, arrangement is made during assembly such that the guide conduit 12 is provided with an opening part 40 at a position corresponding to each branch pipe opening 38, and the branch communication cable 21 is drawn out from the opening part 40 and inserted into the branch tension conduit 37 which is branched off from the guide conduit 12 through a branch member 39. At this moment, the above described Hock-end 42 is provided at the tip of the branch tension conduit 37.

The sheath pipe 1 and the assembled guide conduit 21 provided by the above described provisional operation are wound up on a reel drum or the like and carried in to the installation site. When introducing branch tension conduit 37, Hock-end 42, and others, since there is risk that they may be damaged by the abrasion with the inner wall of the main pipe 17, or may be trapped by steps in the underground pipeline while moving them in the main pipe 17, it is desirable to carry them by placing them on a cart or a simple ship movable in the main pipe 17, and draw them into the main pipe 17 together with a pull member to be described later.

At an installation site, first a pull member is inserted between manholes 9 and 10. The method to install the pull member between the manholes 9 and 10 may be selected from any of known methods including pushing in a rigid body such as wire, blowing in an inserting member like a parachute with air pressure, connecting to a self-propelling cart, and the like. Further, a tension device 22 and tension mechanism 45 are attached to each manhole 9, 10 and branch sewage box 43.

Next, one end of the pull member and the high-strength low-elongation material element 4 of the sheath pipe 1 are connected together at an end part of the main pipe 17, for example, at the manhole 9 and the pull member is taken up from another manhole 10 to insert the sheath pipe 1 in the main pipe 17. Moreover, since the sheath pipe 1 is integrated with the high-strength low-elongation material element 4, it is possible to install the sheath pipe 1 properly in the main pipe 17, without using a twist-prevention device, by drawing the sheath pipe 1 into the main pipe 17 while applying back-tension so that tension is applied on the high-strength low-elongation material element 4.

Next, one end of the high-strength low-elongation material element 4 integrated with the main body 3 of the sheath pipe 1 is wound up with the winding drum 24 of the tension device 22 fixedly installed on the inner wall of the manhole 9 so that the end of the sheath pipe 1 is registered with a predetermined position. Next, the other end of the high-strength low-elongation material element 4 is wound up from the manhole 10 as with the case described above by means of the winding drum 24 of the tension device 22 installed on the inner wall of the manhole 10, the sheath pipe 1 being fixed in the substantially upper part inside the main pipe 17 by applying tension on the high-strength low-elongation material element 4, and the trunk communication cable 6 is inserted into the sheath pipe 1. In this way, it is possible to construct a main pipe of an underground pipeline as an information-communicable underground pipe. Further, when the guide conduit 12 to be described later is not used, if the sheath pipe 1 installed in substantially upper part inside the main pipe 17 sags, a member having a similar shape with the conduit-fixing member 55 shown in FIG. 9 may be fitted to the sagging portion of the sheath pipe 1 to fix it.

From now on, the construction method for forming an underground pipeline as a whole including a branch pipe 7 as an information-communicable underground pipe after constructing the underground pipeline as an information-communicable underground pipe will be described. As described before, one end of the pull member installed in the main pipe 17 is connected with the guide conduit at one end of the main pipe, for example at the manhole 9, and the pull member is taken up from the other manhole 10 to insert the guide conduit 12 in the main pipe 17. In this stage, each of the opening parts 40 provided in the guide conduit 12 is substantially aligned with a corresponding branch sewage box 38 respectively. Upon taking up the guide conduit 12 from one manhole 9 to the other manhole 10, since the guide conduit 12 may be twisted, a twist-prevention device may be interposed between the pull member and the guide conduit 12. When a twist-prevention device is used, it is taken out after the guide conduit 12 is installed in its full length in the main pipe 17.

Next, a branch tension conduit 37 is drawn into the branch pipe 7. In this operation, first a Hock-end 42, which is located at the tip of the branch tension conduit, is positioned directly below the branch pipe 7 by adjusting the position of the guide conduit 12 fore-and-aft in the main pipe 17. Then, the Hock-end 42 installed at one end of the branch tension conduit 37 and located near the branch pipe opening 38 is grabbed and taken out by inserting an arm-like grabber from the branch sewage box 43 while observing with a TV camera. Alternatively, a pull member is inserted from the branch sewage box 43 to one end of the main pipe 17, for example, manhole 9 through the branch pipe 7 and the main pipe 17, then after connecting the branch tension conduit 37 and said pull member, said pull member is pulled up from the branch sewage box 43 to install the branch tension conduit 37 in the branch pipe 7.

Figure 12:
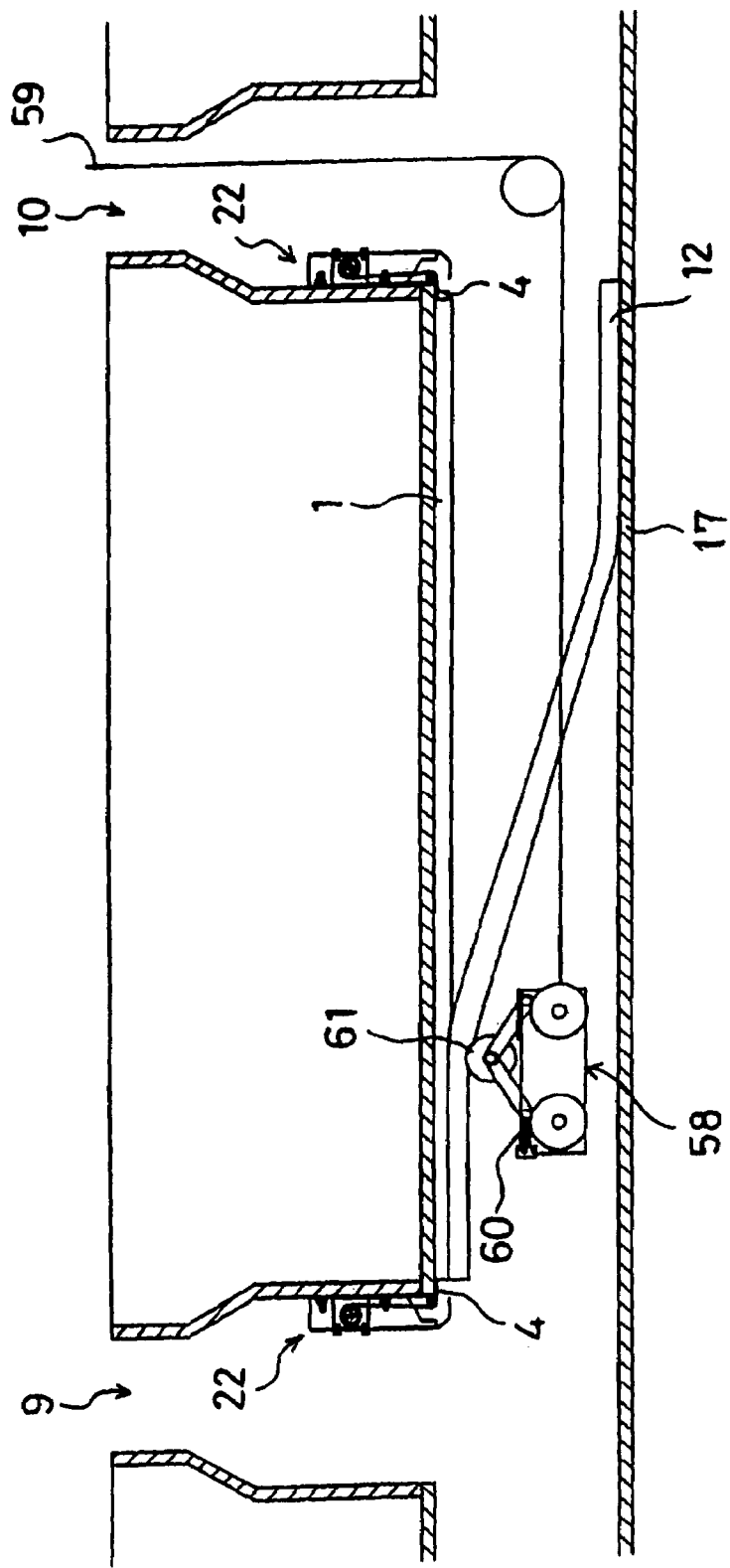
FIG. 12 is a diagram to explain one step of the construction method of an information-communicable underground pipe relating to the present embodiment.

Next, the guide conduit 12 is fitted to the sheath pipe 1. FIG. 12 shows the present embodiment in which the guide conduit 12 is fitted to the sheath pipe 1. In FIG. 12, a fitting device 58 is introduced into the main pipe 17 by manually fitting one end of the guide conduit 12 (left in the figure)

from the inside of the manhole 9. The fitting device 58 moves in the main pipe 17 by taking up a pull-string 59, which has been pre-installed the main pipe 17, from the manhole 10. The guide conduit 12 is pressed against the sheath pipe 1 by the pressing part 61, which is provided in the fitting device 58 and driven by an pushing-up means 60, and thus fitting operation is performed while the fitting device 58 is moving. Further, any device other than the fitting device 58 may be used provided that it can press the guide conduit 12 against the sheath pipe 1 to be fitted thereto while moving. For example, a device like a ball may be used which has such a diameter as to press the guide conduit 12 against the sheath pipe 1 while it is moved.

Then, the branch tension conduit 37 is secured in the upper part inside the branch pipe 7 by inserting the branch tension conduit 37, which is arranged up to the branch sewage box 43, into the tension mechanism 45 while applying tension thereon and tightening it.

Further, when the branch pipe has a bend with a changing angle, the branch tension conduit 37 can not be laid along the upper part of the inner wall of the branch pipe 7 solely by applying tension thereon with the tension mechanism. In such cases, it is possible, even if the branch pipe has a bend, to install the branch tension conduit 37 along the substantially upper part inside the branch pipe 7 by suitably providing a conduit-fixing member 55 at a branch pipe opening 38 in the branch pipe 7 and near the bend.

Further, to securely fix the guide conduit 12 in the upper part of the inner wall of the main pipe 17, it is desirable to install a sagging-prevention member 50 shown in FIG. 8 at a proper spacing in the main pipe 17 (see FIG. 11).

In the manner as described so far, it is made possible: to fit the guide conduit 12, which is provided with branch tension conduits 37, onto the sheath pipe 1 which is installed in substantially upper part inside the main pipe 17; to insert the branch communication cables 21 in parallel in the guide conduit 12 and insert the branch communication cable 21 in the branch tension conduit 37 which is installed in substantially upper part inside the branch pipe 7 connecting to the main pipe 17; and to lay the branch communication cable 21 up to a branch sewage box 43 thereby leading it to each household.

When a pre-inserted string 41 is used in place of the branch communication cable 21, the installation of an information-communicable underground pipe relating to the present invention is completed by finally replacing the pre-inserted string 41 with a branch communication cable 21. Thus, since a pre-inserted string 41 is kept being inserted in the empty room 14 of the guide conduit 12 and in branch tension conduit 37 until the last stage, the branch communication cable 21 will not be damaged during the laying operation thus enhancing the installation stability.

In the operation for replacing the pre-inserted string 41 with a branch communication cable 21, first the branch communication cable 21 is connected to one end of the pre-inserted string 41. This connection may be performed, for example, by crimping a metal ring while abutting one end of the pre-inserted string 41 with one end of the branch communication cable 21. Alternatively, when the coating of the branch communication cable 21 and the material of the pre-inserted string 41 are both plastic and the pre-inserted string has a tubular shape, the connection may also be achieved by forming an overlap portion by inserting the tip of the branch communication cable 21 into the pre-inserted string 41 to a proper length, and then press-bonding the overlap portion by means of a thermo-compression bonding or induction welding to melt and crush the plastic of the overlap portion, thus achieving a shape having substantially no steps. By configuring such that the pre-inserted string 41 and the branch communication cable 21 have substantially same outer diameter, it will become possible to prevent the breakage of the branch communication cable 21 due to a stress concentration which may be caused when an excess withdrawal force acts on a step portion during the withdrawal of the branch communication cable 21. Moreover, such method for connecting the pre-inserted string 41 and the branch communication cable 21 is not limited to a particular method, and the present invention can be applied to other cases where connection is performed in a different method using a different pre-inserted string.

As so far described, it is possible to construct an underground pipeline including a branch pipe 7 connected to a main pipe 17 as an information-communicable underground pipe.

In the following, another embodiment of the present invention will be described referring to the drawings.

Figure 26:
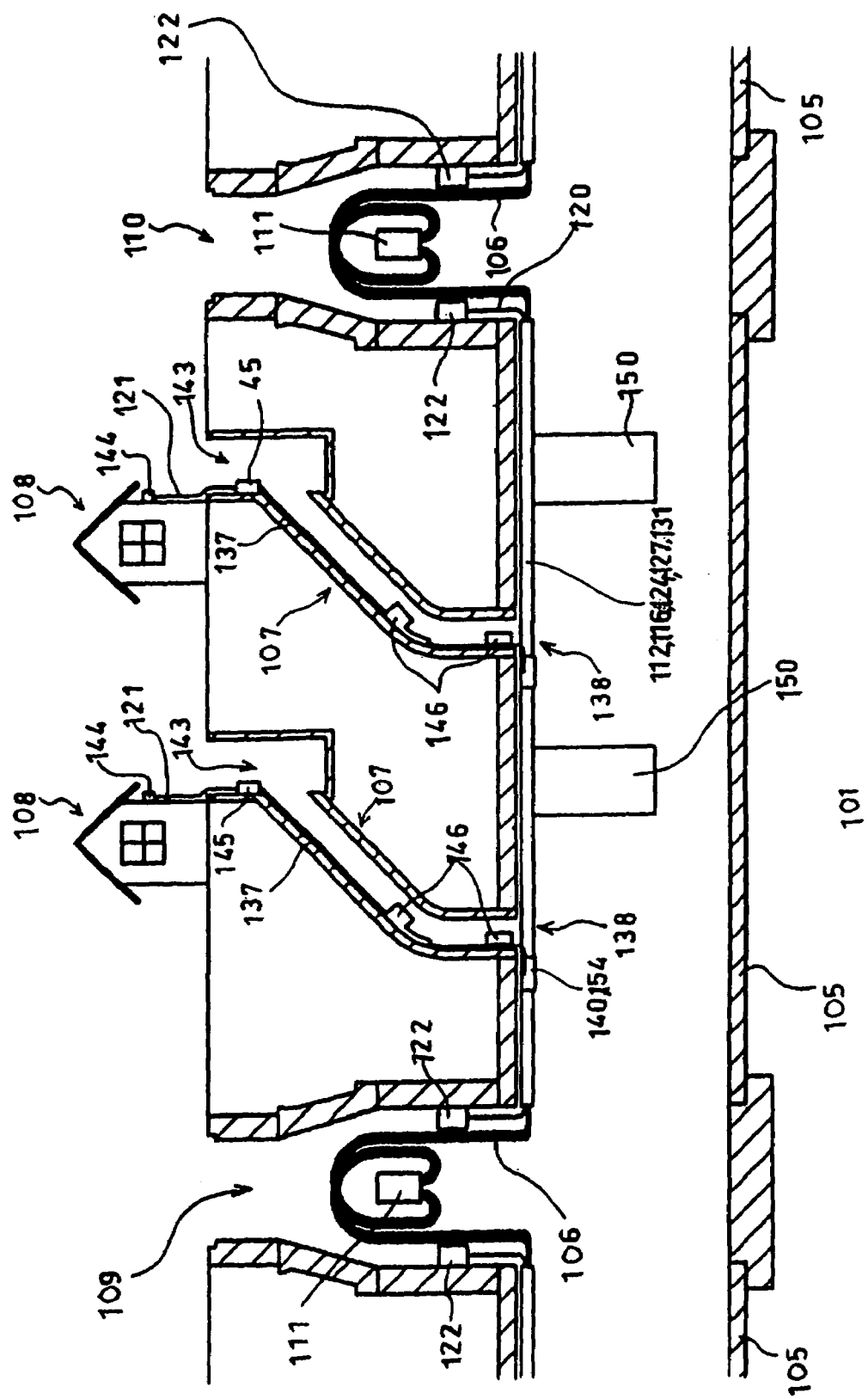
FIG. 26 is a diagram to show the construction structure of an information-communicable underground pipe relating to another embodiment.

FIG. 26 is a sectional view of an underground pipeline such as a sewer pipe showing an example of the construction structure of the information-communicable underground pipe according to another embodiment of the present invention. The construction structure of the information-communicable underground pipe according to the present embodiment is applied to an underground pipeline consisting of a main pipe 105 which comprises a sheath pipe 103 for installing the communication cables 106 thereinto and is configured as an information-communicable underground pipe (see FIG. 29), and branch pipes 107 which are connected to the main pipe 105 and lead to individual households 108, and which are not an information-communicable underground pipe, in order to insert the branch communication cable 121 into the branch pipe 107 as well thereby making the underground pipeline as a whole an information-communicable underground pipe. Moreover, the main pipes 105 are connected through manholes 109, 110 such as a pit, and a branch connection box 111 is installed in the manhole 109 and the like. And the communication cables 106 (hereinafter referred to as "trunk communication cable 106") inserted in the sheath pipe 103 installed in the upper part inside the main pipe 105 are connected with one another in this branch connection box 111.

Figure 13:
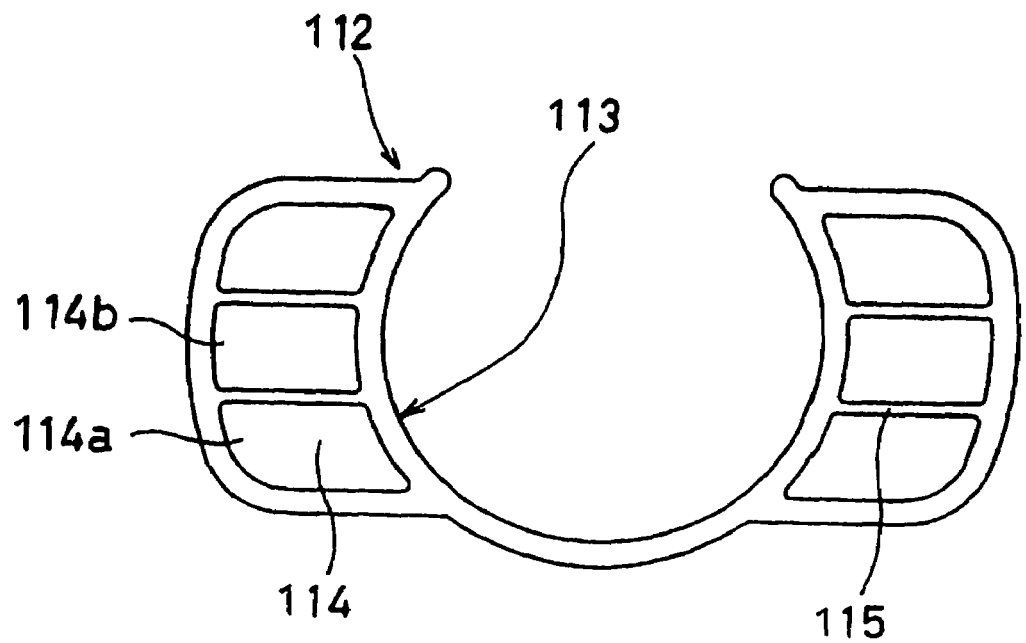
FIG. 13 is a diagram to show an example of the guide conduit which is a construction member of an information-communicable underground pipe relating to another embodiment.

First, the guide conduit which is a construction member of the information-communicable underground pipe according to the present embodiment will be described. FIG. 13 shows a guide conduit 112 (guide conduit embodiment I) as an example of such guide conduit. This guide conduit 112 is used for further inserting communication cables in the main pipe 105 (see FIG. 29) having a sheath pipe 103. In FIG. 13, the guide conduit 112 has a length along the sheath pipe 103, and also has a fitting part 113 for fitting the guide conduit to the outer surface of the sheath pipe 103, and an empty room 114 which is formed in its inside for inserting principally branch communication cables (commonly referred to as a "drop cable") along its lengthwise direction. The empty room 114 is formed surrounding the fitting part 113 and vertically sectioned by a partition plate 115 so as to form multiple layers (114a, 114b, . . . ), and branch communication cables are inserted into each of these layers (114a, 114b, . . . ). The empty room 114 can also be used for inserting trunk tension members and trunk communication members to be described later (commonly referred to as a "trunk cable" or "branch cable"). Moreover, it is also possible to have a pre-inserted string inserted in advance for replacing a communication cable when installing the guide conduit 112 in the main pipe 105 as will be described later.

Figure 14:
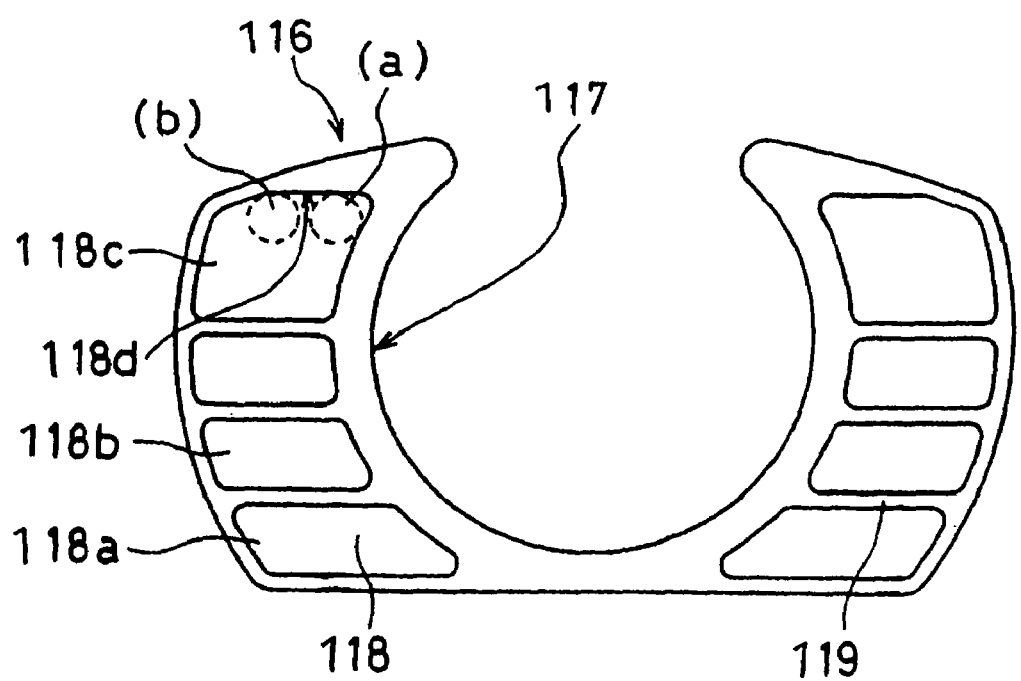
FIG. 14 is a diagram to show an example of the guide conduit which is a construction member of an information-communicable underground pipe relating to another embodiment.

Further, FIG. 14 shows a guide conduit 116 as another embodiment (guide conduit embodiment II). As with the guide conduit 112, the guide conduit 116 also have a fitting part 117 and its empty room 118 is sectioned vertically by partition plates 119 to form four separate layers (118a, 118b, . . . ). Thus, various forms can be adopted as the structure of the guide conduit, provided that there is provided a fitting part to be fitted to the outer surface of the sheath pipe 103 and an empty room into which communication cables can be inserted in the lengthwise direction. Moreover, the guide conduit 112, 116 is preferably made of plastic such as polyethylene and has a light weight and chemical resistance, but other materials may be selected depending on the kind of the underground pipe. In this regard, the following description of the guide conduit 116 can be equally applied to the guide conduit 112.

Figure 29:
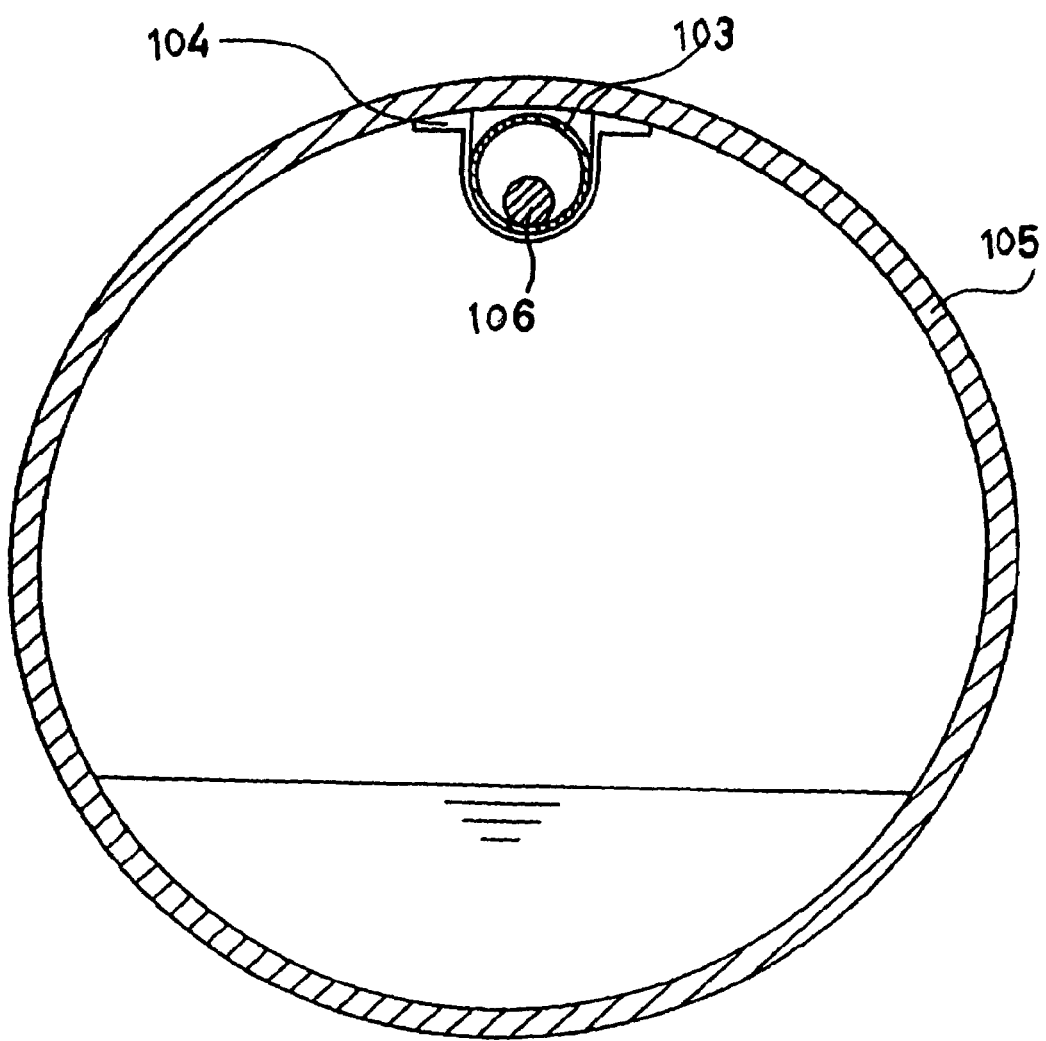
FIG. 29 is a sectional view of the main pipe which is configured to be an information-communicable underground pipe and comprises a sheath pipe to be inserted with a communication cable.
Figure 30:
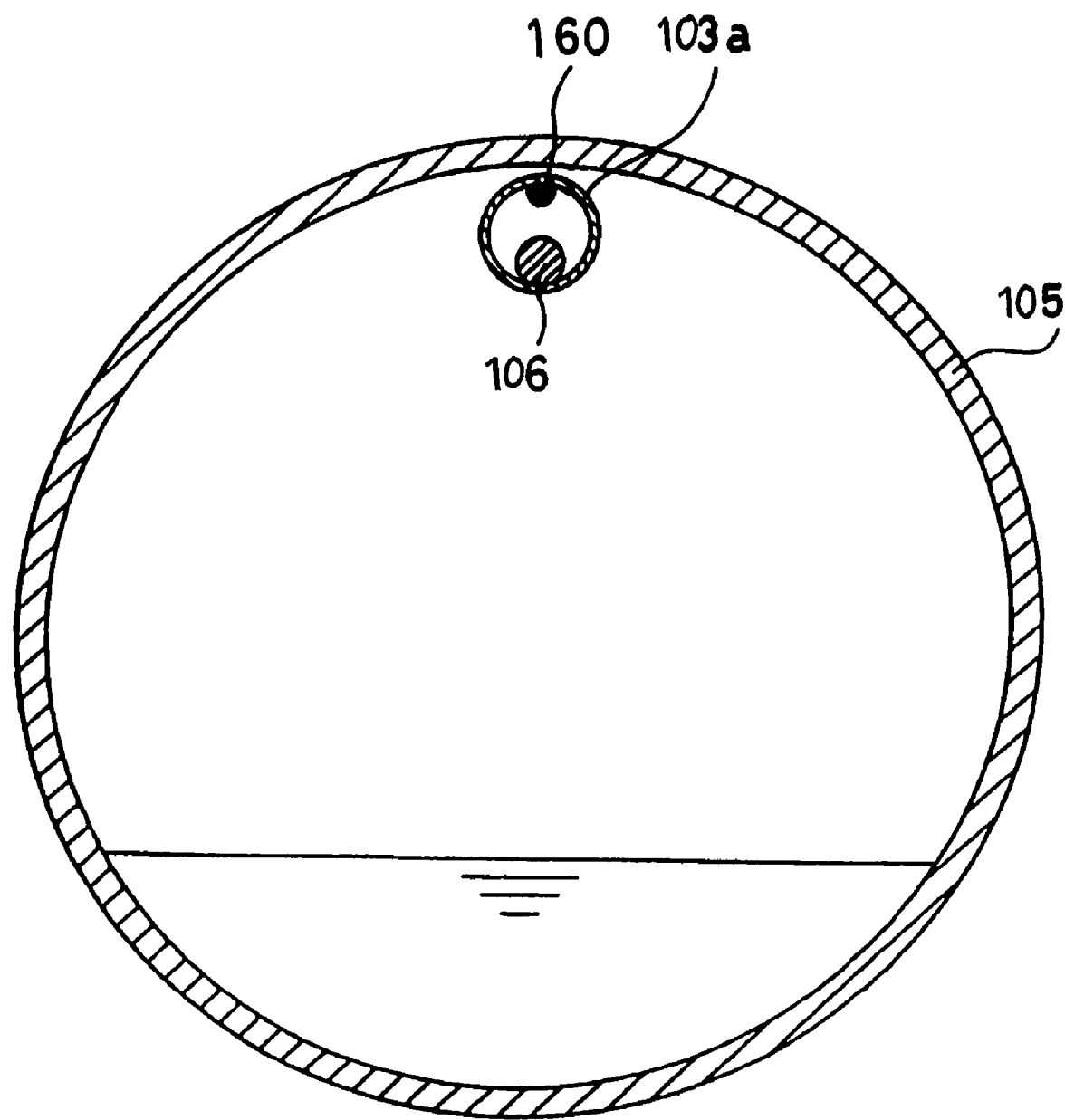
FIG. 30 is a sectional view of the main pipe which is configured to be an information-communicable underground pipe and comprises a sheath pipe to be inserted with a communication cable.

A high-strength low-elongation material element 160 as well as the communication cable 106 are inserted in the sheath pipe 103a which is provided in the main pipe 105 shown in FIG. 30 for inserting communications cables 106. The sheath pipe 103a is installed in the upper part inside the main pipe 105 by applying tension on the high-strength low-elongation material element 160 between manholes 109 and 110 by means of tension device 122 (to be described later) installed in the manholes 109, 110. Moreover, when the distance between the manholes 109, 110 is large and the length of the main pipe 105 installed with the sheath pipe 103a is large, the sheath pipe 103a may bend at, for example, a middle point between manholes 109 and 110, for example and, therefore, a bracket 104 as shown in FIG. 29 is attached so as to reduce the bending of the sheath pipe 103a. The high-strength low-elongation material element 160 may be made of the same material as that for trunk tension member 120 to be described later.

The sheath pipe 103a, in which communication cables as well as the high-strength low-elongation material element 160 are inserted, is fitted to the outside of the guide conduit as in the same manner as the sheath pipe 103 in FIG. 29 and as will be described later, and can be used for further inserting communication cables. Moreover, in the following embodiment, description will be made on the sheath pipe 103, but it will be valid for the case in which the sheath pipe 103a is used.

Figure 15:
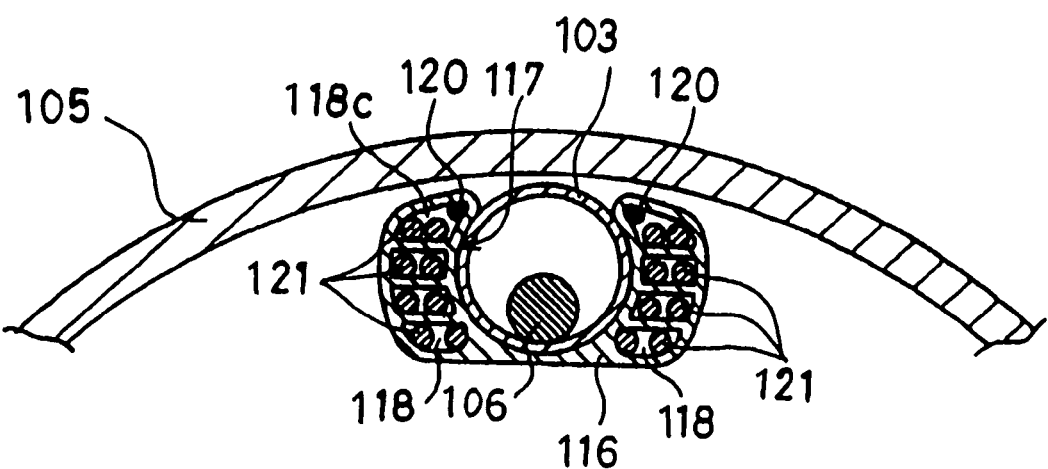
FIG. 15 is a cross sectional view to show a state that a guide conduit, which is a construction member of an information-communicable underground pipe according to another embodiment, is fitted to a sheath pipe.

FIG. 15 is a sectional view to show the state in which guide conduit 116, an example of the guide conduit, is fitted to the sheath pipe 103. The sheath pipe 103 is installed in the upper part inside the main pipe 105 and, in its inside, the trunk communication cable 106 is inserted. And, the guide conduit 116 having a fitting part 117 is fitted to the outside of the sheath pipe 103. As described before, the guide conduit 116 is made of plastic such as polyethylene, and can be easily fitted to the outer surface of the sheath pipe 103 since the shape of the fitting part 117 quickly recovers elastically right after it is deformed in bending.

In the highest layer 118c in the empty room 118 of the guide conduit 116, there are inserted a trunk tension member 120 and branch communication cables 121. Each of these branch communication cables 121 is one which is branched off from the trunk communication cable 106 at a branch connection box 111 provided in the manhole 109 and the like, and laid up to each household 108 as will be described later in more detail (see FIG. 26). The branch communication cables 121 are branched off from the trunk communication cable in a necessary number corresponding to the number of households requiring the installation.

Further, as will be well understood from FIG. 15, the empty room 118 of each layer is sectioned so that the height of each layer is smaller than twice of the outer diameter of the branch communication cable 121 and thereby, if multiple communication cables are inserted in each layer, the communication cable will not get over an adjacent communication cable and the arrangement will remain unchanged. Thus, entanglements of the communication cables and faulty wiring to individual households will be prevented.

Moreover, the trunk tension member 120 is tensioned between manholes 109 and 110 or the like to play a role in urging the guide conduit 116 (or guide conduit 112) in the upper part inside the main pipe 105 (see FIG. 26). This trunk tension member 120 may be formed of a string made of metal wire, high-strength low-elongation fibers called as a super fiber, or a textile in which those fibers are used in the lengthwise direction. The general definition of this super fiber refers to fibers which have a strength of not lower than 2 GPa and an elastic modulus of not lower than 50 GPa. The kind of such fibers includes glass fibers, para-alamido fibers, carbon fibers, steel fibers, ultra-high-strength polyethylene fibers, PBO (poly-p-phenylene benzo-bis-oxazol) fibers, polyarylate fibers, etc., and any of these can be applied.

The tension device 122 shown in FIG. 26 is one in which a manual winch of a drum-winding type is paired with a hook, and the device is installed in the manholes 109, 110 to urge the guide conduit 116 in the upper part inside the main pipe 105 or toward the fitting direction by securing one end of the trunk tension member 120 inserted in the guide conduit 116 with the hook and, at the other end, by applying tension with the winch between the manholes 109 and 110.

Figure 16:
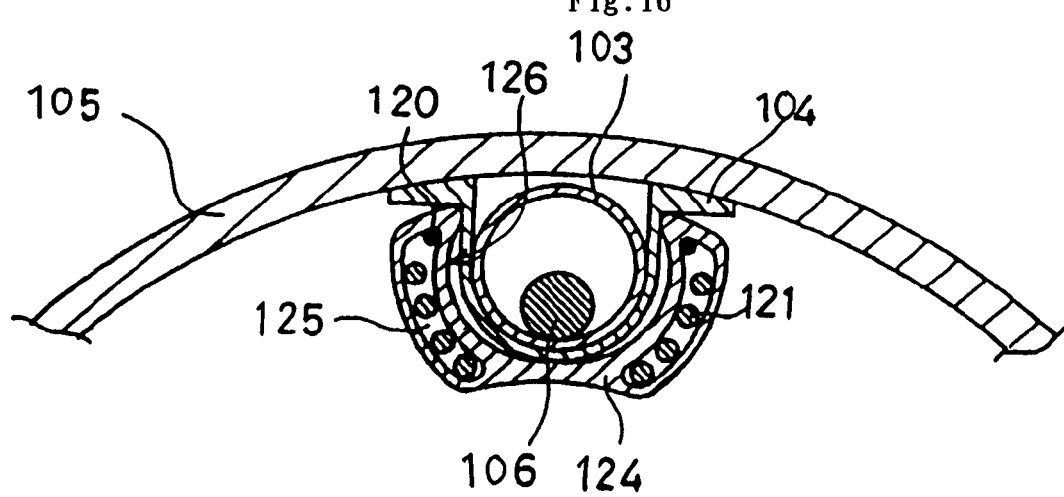
FIG. 16 is a schematic diagram to explain the sate in which the guide conduit relating to an example of another embodiment is fitted to the sheath pipe.

FIG. 16 shows a state of the guide conduit 124 (guide conduit embodiment III) fitted to the sheath pipe 103 in a section of the portion where a bracket is provided to fix the sheath pipe 103 in the main pipe 105. In this regard, this guide conduit 124 shows an example of which empty room 125 is not sectioned by a partition plate. As clearly seen in this figure, since the outer diameter of the bracket 104 is larger than that of the sheath pipe 103, the fitting part 126 of the guide conduit 124 is fitted while being slightly deformed.

Thus, although the fitting between the guide conduit 124 and the sheath pipe 103 may become loose at a portion where the bracket 104 is provided, the guide conduit 124 is secured in the upper part inside the main pipe 105 because the guide conduit 124 is urged in the fitting direction by applying tension on the trunk tension member 120 between the manholes 109 and 110.

In this regard, since the trunk tension member 120 is used under tension between manholes, it is placed substantially straight in the lengthwise direction of the main pipe 105. In this case, the position in which the trunk tension member 120 is disposed with respect to the sheath pipe 103 is to be restricted at the portion of the guide conduit 124 to be fitted with the bracket, that is the portion where the trunk tension member 120 is placed furthest away from the sheath pipe 103. Thus, at this position, the tension member 120 is to urge the guide conduit 124 in the fitting direction.

Therefore, it is desirable to form the shape of the empty room, into which the trunk tension member 120 is inserted, such that the position of the trunk tension member 120 with respect to the sheath pipe 103 is movable in the outward direction. For example, in the case of the guide conduit 116 (guide conduit embodiment II) shown in FIG. 14, the upper wall surface 118d of the highest layer 118c of the empty room 118 is desirably horizontal. Forming the upper wall surface 118d in this way makes the trunk tension member 120 to be slidable substantially along the upper wall surface 118d in the layer 118c in accordance with the outer diameter of the bracket 104. That is, when the guide conduit 116 is fitted to the sheath pipe 103, the guide conduit will be deformed as with the guide conduit 124 shown in FIG. 16 at a portion where the bracket 104 is provided, and thus the position of the trunk tension member 120 with respect to the sheath pipe 103 will be restrained. On the other hand, at a portion where the guide conduit is not fitted to the bracket 104, that is the portion where the guide conduit is fitted to the outer surface of the sheath pipe 103 as shown in FIG. 15, the trunk tension member 120 moves outwardly along the upper wall surface 118*d* in the layer 118*c*, and thus the fitting state of the guide conduit 116 to the sheath pipe 103 will be maintained in a substantially proper state. The position of the trunk tension member 120 in this state is shown by a dotted line in FIG. 14, where the position (a) shows the position of the trunk tension member 120 with respect to the guide conduit 116 at the portion fitted to the bracket 104 (in reality, the guide conduit 117 is deformed) and the position (b) shows the position of the trunk tension member 120 with respect to the guide conduit 116 at the portion fitted to the outer surface of the sheath pipe 103. Moreover, in practice, the position (a) and the position (b) are located outwardly in the same position with respect to the sheath pipe 103, but that is schematically shown as separate positions in FIG. 14.

Figure 17:
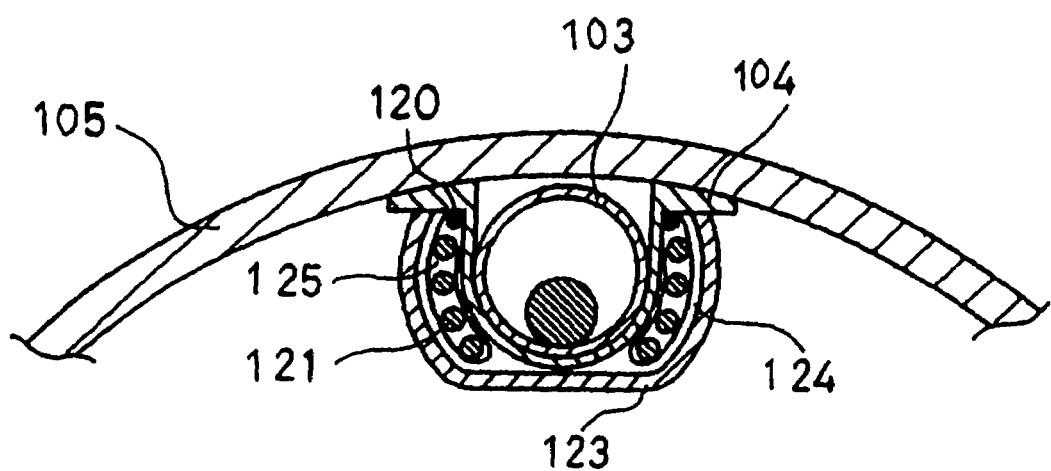
FIG. 17 is a diagram to show a state that the guide conduit relating to an example of another embodiment is being connected by a connecting member.
Figure 18:
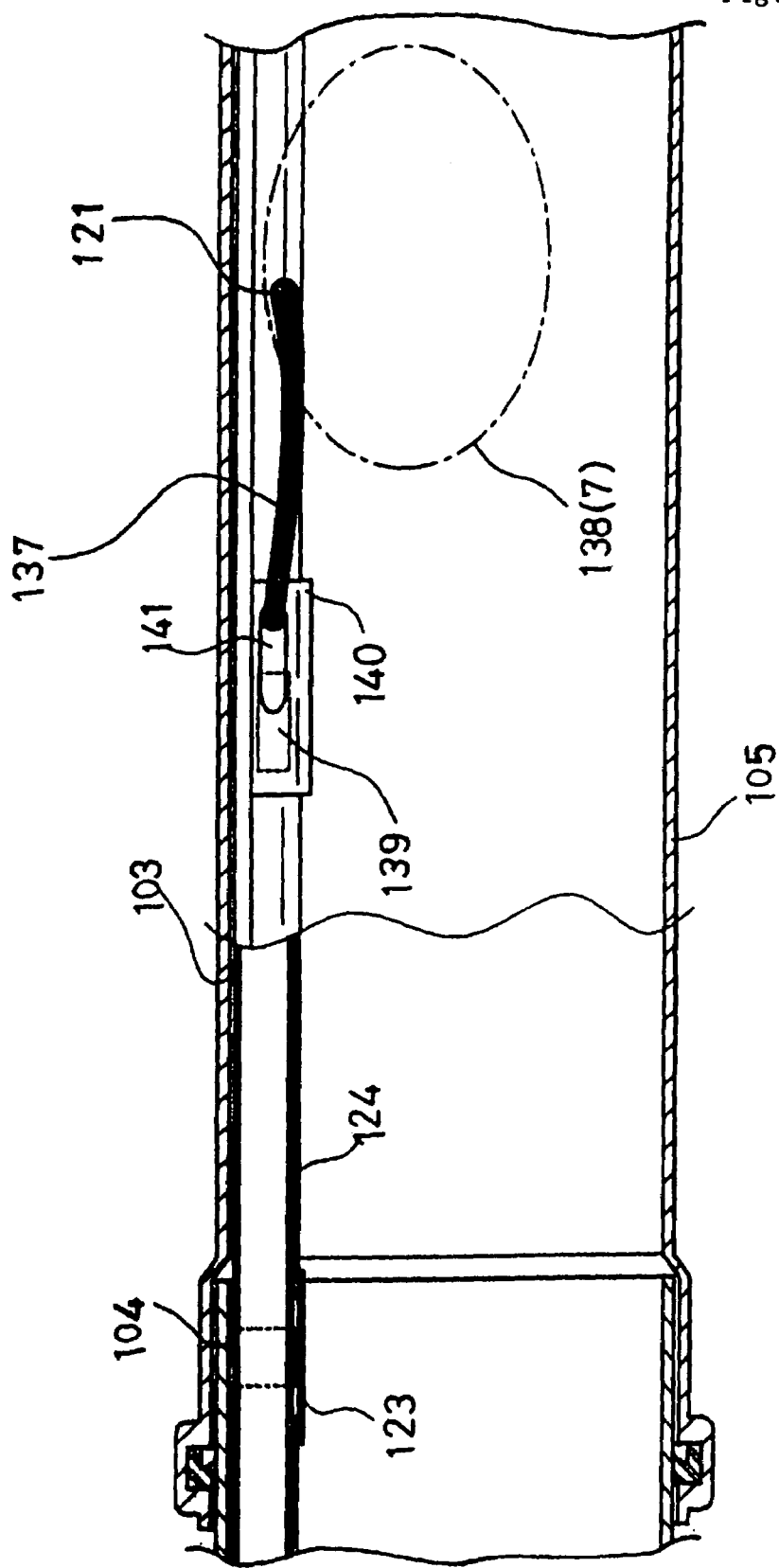
FIG. 18 is a sectional view to show a state that a guide conduit relating to an example of another embodiment is attached to a main pipe.

Moreover, to prevent the loosening of the fitting of the guide conduit 124 to the sheath pipe 103 at the portion where the bracket 104 is provided, the structure of the guide conduit 124 fitted to the outside of the sheath pipe 103 may be such that the guide conduit is divided at the portion corresponding to the bracket 104 as shown in FIGS. 17 and 18, and the divided guide conduits 124 are integrated together with a connecting member 123 provided in such a way as to surround the outer part of the bracket 104.

FIG. 17 is a sectional view including the bracket 104 to show the state that the guide conduit 124 is divided into pieces of a length substantially corresponding to the spacing at which the brackets 104 are provided, and these pieces are connected by a connecting member 123. FIG. 18 is a longitudinal sectional view of the central part of the main pipe 105.

As shown in FIGS. 17 and 18, the connecting member 123 has a inner shape which allows it to be fitted to the outer surface of the guide conduit 124 and, in this figure, one which is substantially formed in an upward facing C-shape is shown as an example. This connecting member 123 allows the integration of the divided guide conduits 124 without being affected by the difference in the diameters of the sheath pipe 103 and the bracket 104. Moreover, the structure wherein the guide conduits divided at a portion corresponding to the bracket 104 are integrated by means of the connecting member 124 is applicable not only to the guide conduit 124 of the embodiment III but also to the guide conduits (112, 116) of other embodiments (I, II).

Figure 19:
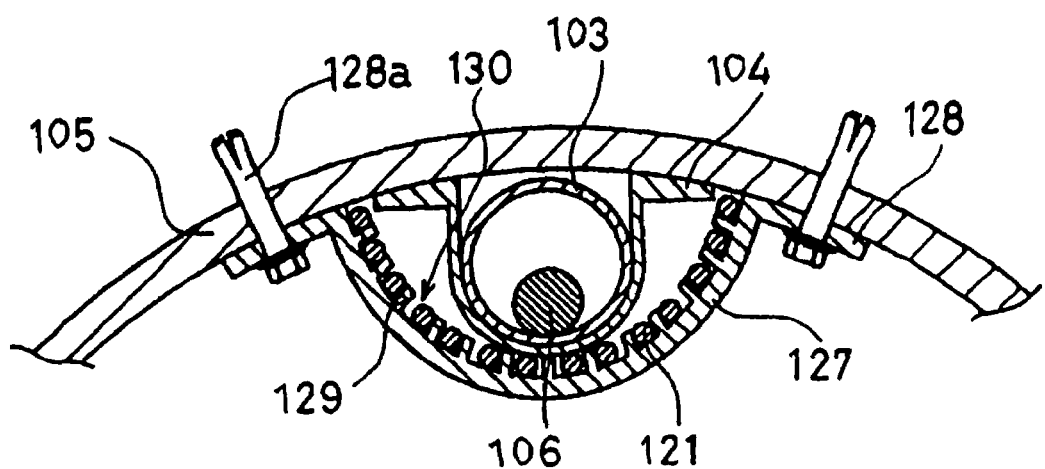
FIG. 19 is a sectional view to show a state that a guide conduit relating to an example of another embodiment is attached to the main pipe.
Figure 20:
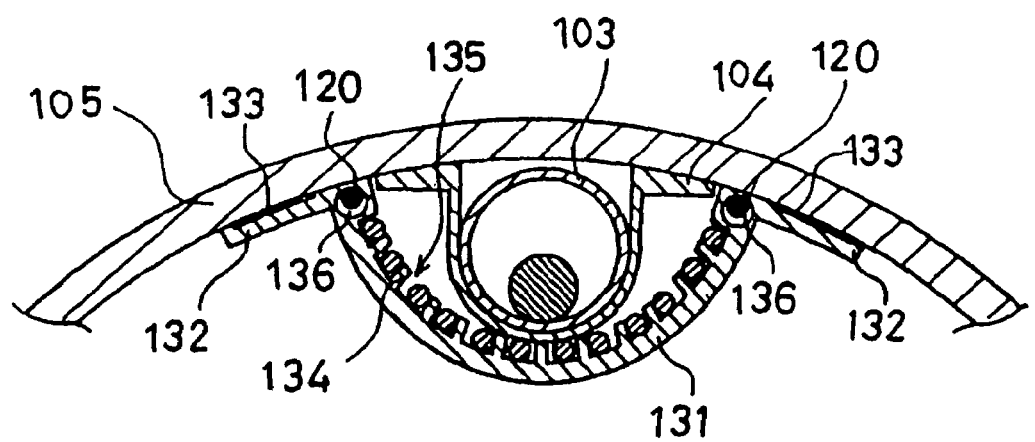
FIG. 20 is a sectional view to show a state that a guide conduit relating to an example of another embodiment is attached to the main pipe.

Although all the guide conduits (112, 116, 124) so far described have a structure in which the guide conduits are fitted to the outside of the sheath pipe 103 through a fitting part, the structure of the guide conduit is not limited to the type in which the guide conduit is fitted to the outside of the sheath pipe 103 and may be a type in which the guide conduit is installed in the main pipe 105 by being integrated with the inner surface of the main pipe 105 in such a way as to surround the sheath pipe 103 as shown in FIGS. 19 and 20.

The guide conduit 127 (guide conduit embodiment IV) shown in FIG. 19 is one which is to be installed in the upper part of the inner surface of the main pipe 105 with its lengthwise direction being aligned, and its cross section is formed in a substantially C-shape. And, the C-shape cross section is provided at each edge in the lengthwise direction with a flange-like mounting part 128. Moreover, the inner periphery of the C-shape cross section is formed with cable-receiving spaces 130 sectioned by partition plates 129 extending in the lengthwise direction and forming an empty room which opens up to the inner periphery side.

This guide conduit 127 is to be integrally attached to the inner surface of the main pipe 105 by connecting the flange-type mounting part 128, which is close contact with the upper part of the inner surface of the main pipe 105, and the inner surface of the main pipe 105 with an anchor bolt 128*a*. At this moment, the inner periphery side of the guide conduit 127 is formed to be large enough to surround the sheath pipe 103 attached to the upper part inside the main pipe 105 with the bracket 104. Each cable-receiving space 130, which is an empty room provided on the inner periphery side of the guide conduit 127, is formed such that a branch communication cable 121 may be inserted thereinto.

The guide conduit 131 (guide conduit embodiment V) also has a cross section formed in a substantially C-shape as with the guide conduit 127 of the embodiment IV and, in a like manner, each edge of the C-shape cross section in the lengthwise direction is provided with a flange-type mounting part 132. And, cable-receiving spaces 135 forming an empty room which opens up to the inner periphery side are formed in the inner periphery of the C-shape cross section by being sectioned by the partition plates 134.

This guide conduit 131 is, as with the guide conduit 127, to be attached to the upper part of the inner surface of the main pipe 105 surrounding the sheath pipe 103 and the bracket 104, but it is integrally bonded by means of an adhesive layer 133 formed between the mounting part 132 and the inner surface of the main pipe 105 and consisting of an adhesive such as epoxy resin. And in each edge of the C-shape cross section where the mounting part 132 is provided, there is provided a through-hole 136 formed in the length wise direction, and a trunk tension member 120 is inserted in this through-hole. The function of this trunk tension member 120 is the same as the case of the guide conduits 112 and 116. Moreover, the adhesive layer 133 is not limited to one based on adhesives such as epoxy resin, but may be, for example, one in which the mounting part 132 and/or the inner surface of the main pipe 105 is welded by heat, or one in which a metal plate is pre-installed in the guide conduit and is fused by heating from outside by means of a high-frequency induction heating to integrate them. The formation of the adhesive layer is desirably selected from adhesion, welding, fusing, etc. in accordance with the materials of the inner surface of the main pipe 105 and the mounting part 132.

In the case of the guide conduits 127 and 131, a dedicated device for anchor bolt mounting, bonding, etc. is required when installing the guide conduit in the main pipe 105; however, any device can be used for the installation of the guide conduit, provided that the device has at least a positioning mechanism for installing the guide conduit in the main pipe 105 in such a manner as to surround the sheath pipe 103, and a mechanism for operating the integration means such as anchor bolt mounting and bonding.

Figure 27:
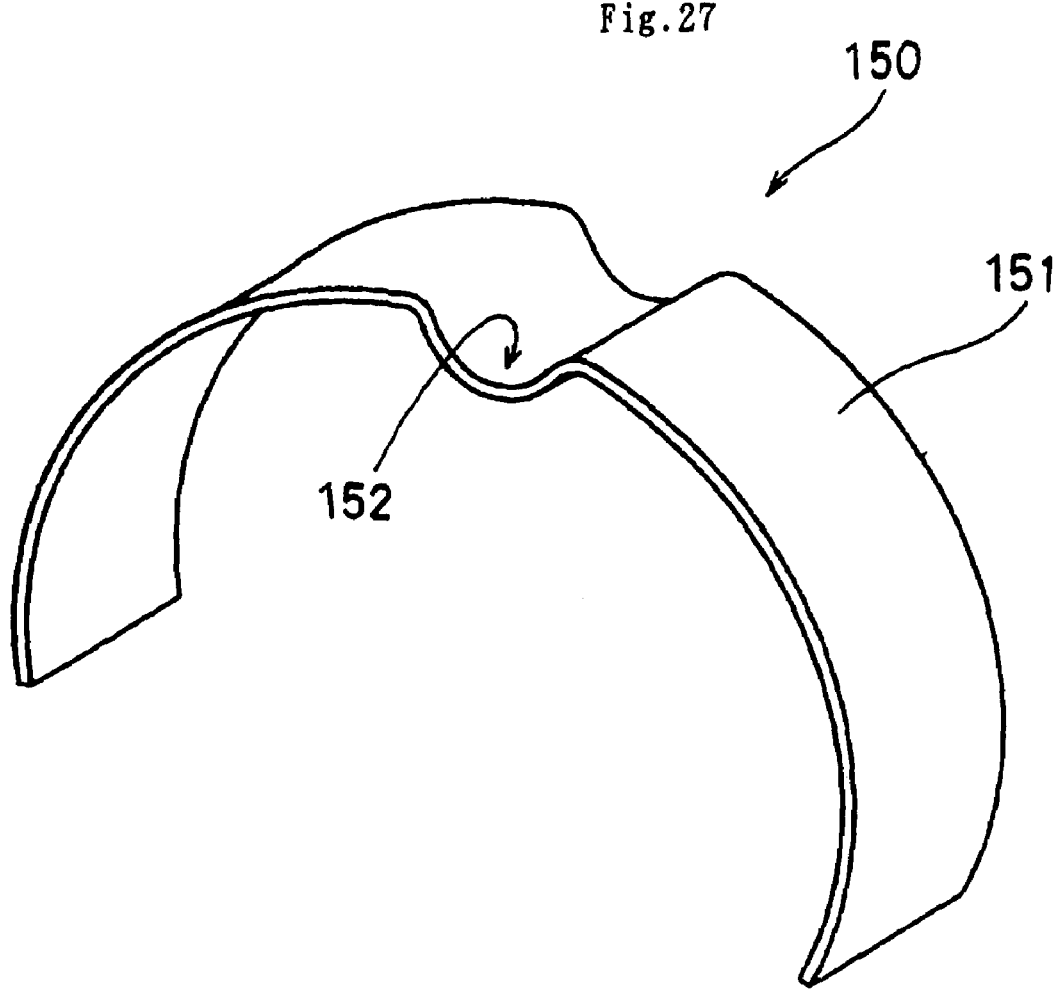
FIG. 27 is a perspective view to show a sagging-prevention member used for the construction structure or the construction method of an information-communicable underground pipe relating to another embodiment.

Furthermore, upon installing the guide conduits (112, 116, 124, 127, 131) so far described in the main pipe 105, it is possible to use a sagging-prevention member 150 consisting of a cylindrical fixing part 151 having a concave part 152 in its central part as shown in FIG. 27 in order to assistively prevent the sagging of the guide conduit radially inward direction of the main pipe 105 by placing multiple of them at a proper spacing in the main pipe 105 as shown in FIG.

26. Moreover, it is possible to prevent the guide conduit being detached from the sheath pipe 103 or being detached from the inner surface of the main pipe 105 during a high-pressure cleaning in the conduit maintenance work. The cylindrical fixing part 151 of the sagging-prevention member 150 is fixed to the inner wall of the main pipe 105 while retaining the guide conduit in its concave part 152.

So far, description has been given on the structure for laying the branch communication cables in parallel around the sheath pipe 103 by using the guide conduits (112, 116, 124, 127, 131) in the main pipe 105 which is configured as an information-communicable underground pipe. Next, the structure for laying the branch communication cables from such main pipe 105 into a branch pipe 107 which is not an information-communicable underground pipe will be described.

Figure 21:
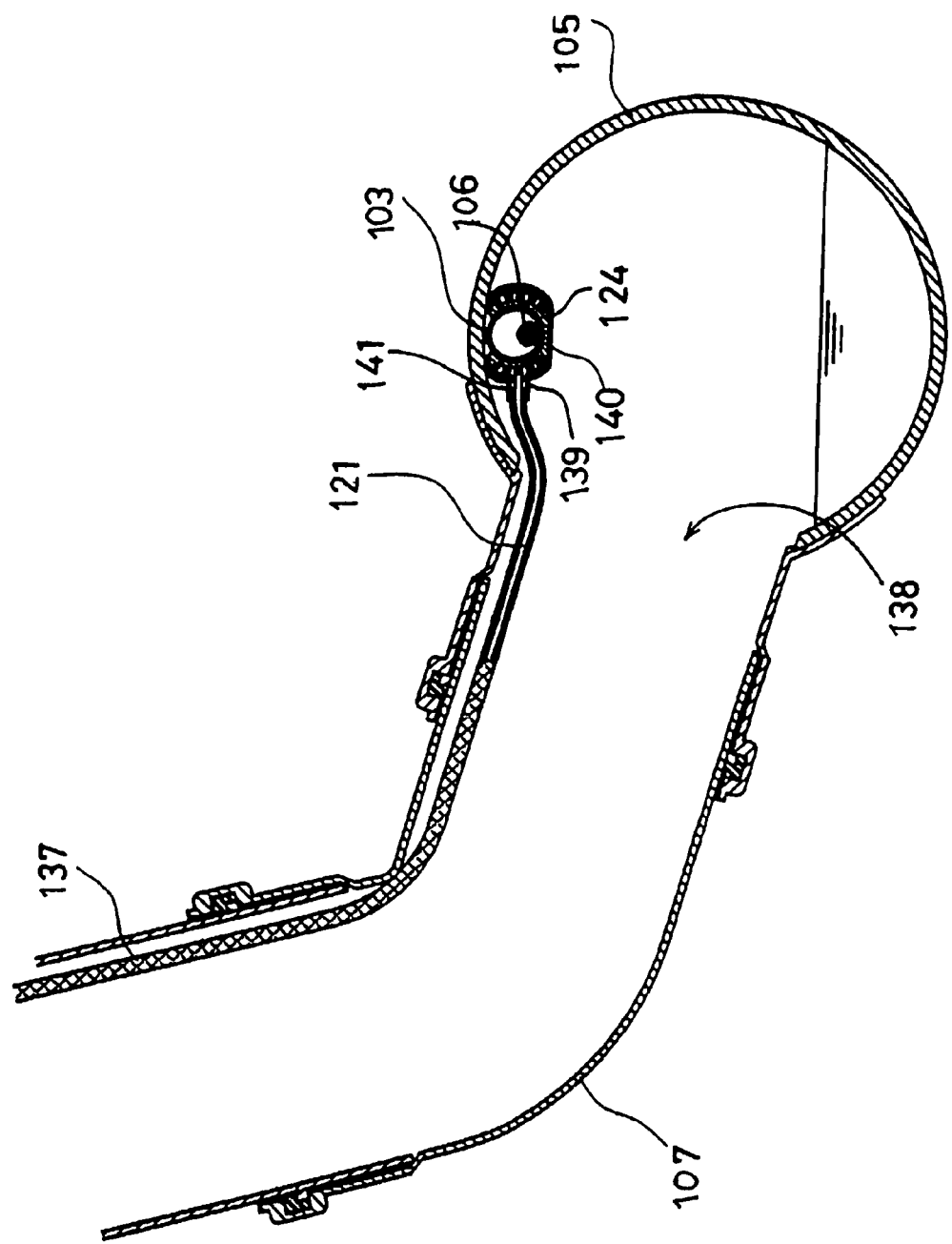
FIG. 21 is a sectional view of part of the construction structure of an information-communicable underground pipe relating to another embodiment.
Figure 22:
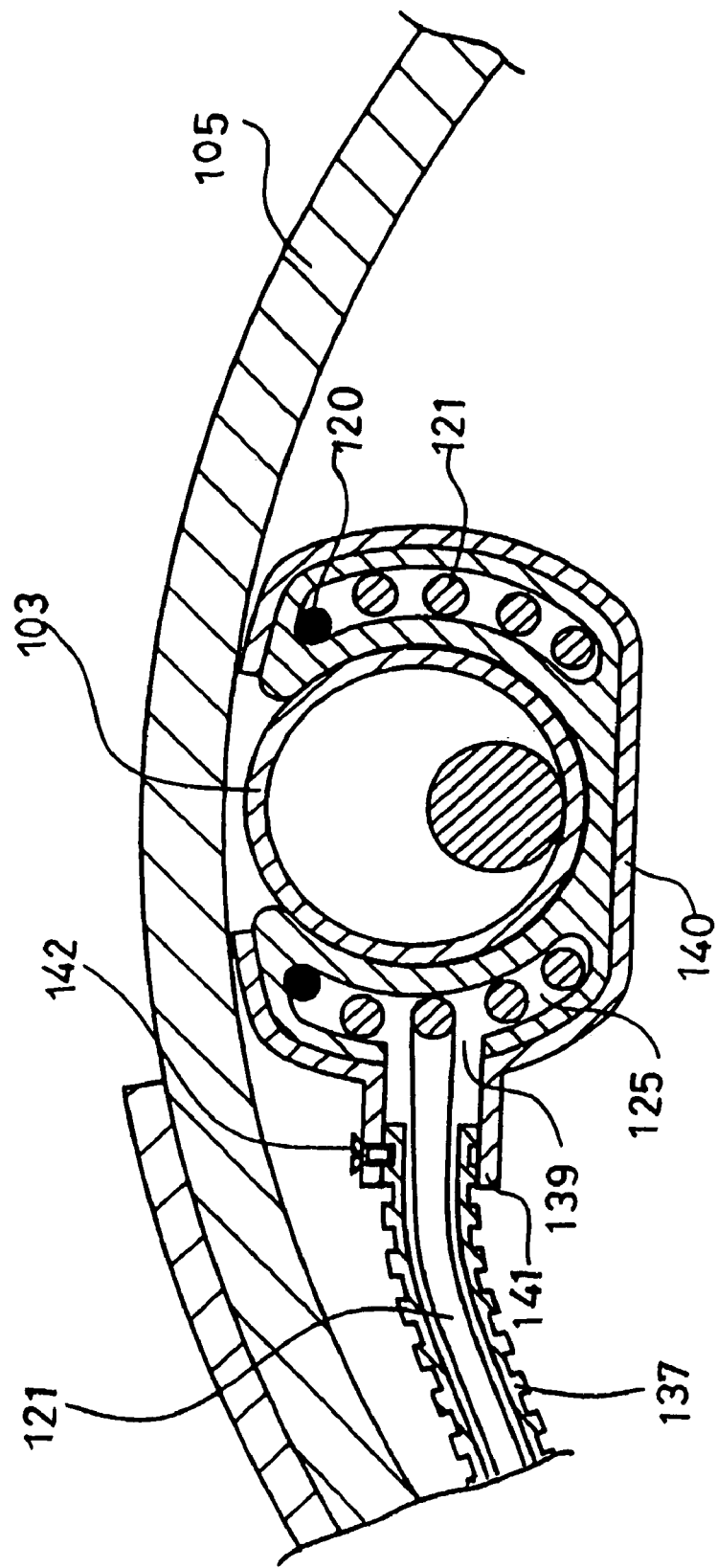
FIG. 22 is a partially enlarged sectional view of FIG. 9.

FIG. 21 is a sectional view of the main pipe 105 and the branch pipe 107 which is connected to the main pipe 105 at the branch pipe opening 138, and FIG. 22 is a partially enlarged view thereof. FIG. 18 is a longitudinal cross section of the main pipe 105 near the branch pipe opening 138 (shown by a fictitious line). As shown in these figures, the guide conduit 124 (guide conduit 112 or 116 may be used in place of guide conduit 124) is provided with a long-hole type opening part 139 at the position corresponding to the connection part (branch pipe opening 138) of the branch pipe 107 and the main pipe 105, and the long-hole type opening 139 provides the communication between the empty room 125 inside the guide conduit 124 and the outside. This opening part 139 is, as will be described later, intended for drawing out the branch communication cable 121 from the guide conduit 124 and making them branched to the branch pipe 107, and provided in a number corresponding to the number of the branch pipes at the positions substantially corresponding to each branch pipe opening 138.

The branch members 140 are fittingly attached to the outer surface of the guide conduit 124 in such a way as to cover the opening part 139. The branch member 140 has a cross sectional shape, as with the above described connecting member 123, which allows fitting to the outer surface of the guide conduit 124 and is of a substantially C-shape. The branch member 140 is provided with a hollow branch part 141 protruding in the outward direction of the guide conduit 124, and through this hollow part of the branch part 141, the opening part 139 provided in the guide conduit 124 is in communication with the outside.

The branch tension conduit 137 is integrally screwed, as shown in FIG. 22, into the front end of the branch part 141 protruding to the outside through the screw 142. Moreover, adhesion, fusion, and the like may be adopted as the integration means. The branch tension conduit 137 consists of a flexible pipe made of stainless steel or plastic, or a tubular textile with a coating formed on the inner surface and/or outer surface, into which the communication cable 121 is inserted. That is, the branch tension conduit 137 protects the branch communication cable 121 from the outside preventing it from being surface damaged or degraded, and plays a roll in installing the branch communication cable 121 in the branch pipe 107 by being applied tension thereon as will be described later. For the branch tension conduit 137, one which has a bending property better than the allowable bending radius of the branch communication cable 121 is used so that the branch communication cable 121 to be inserted inside will not be bent to the extent smaller than the minimum bending radius (allowable bending radius). This is to prevent the branch communication cable 121 inserted in the branch tension conduit 137 from being bent to a radius smaller than its allowable bending radius thereby being broken.

The branch tension conduit 137 in which the branch communication cable 121 is inserted is arranged along the upper part inside the branch pipe 107 up to the branch sewage box 143 as shown in FIG. 26. In this branch sewage box 143, a tension mechanism 145, which can be inserted with the branch tension conduit 137 and can be applied tension on it, is provided, and this tension mechanism 145 applies tension on the branch tension conduit 137.

Figure 28:
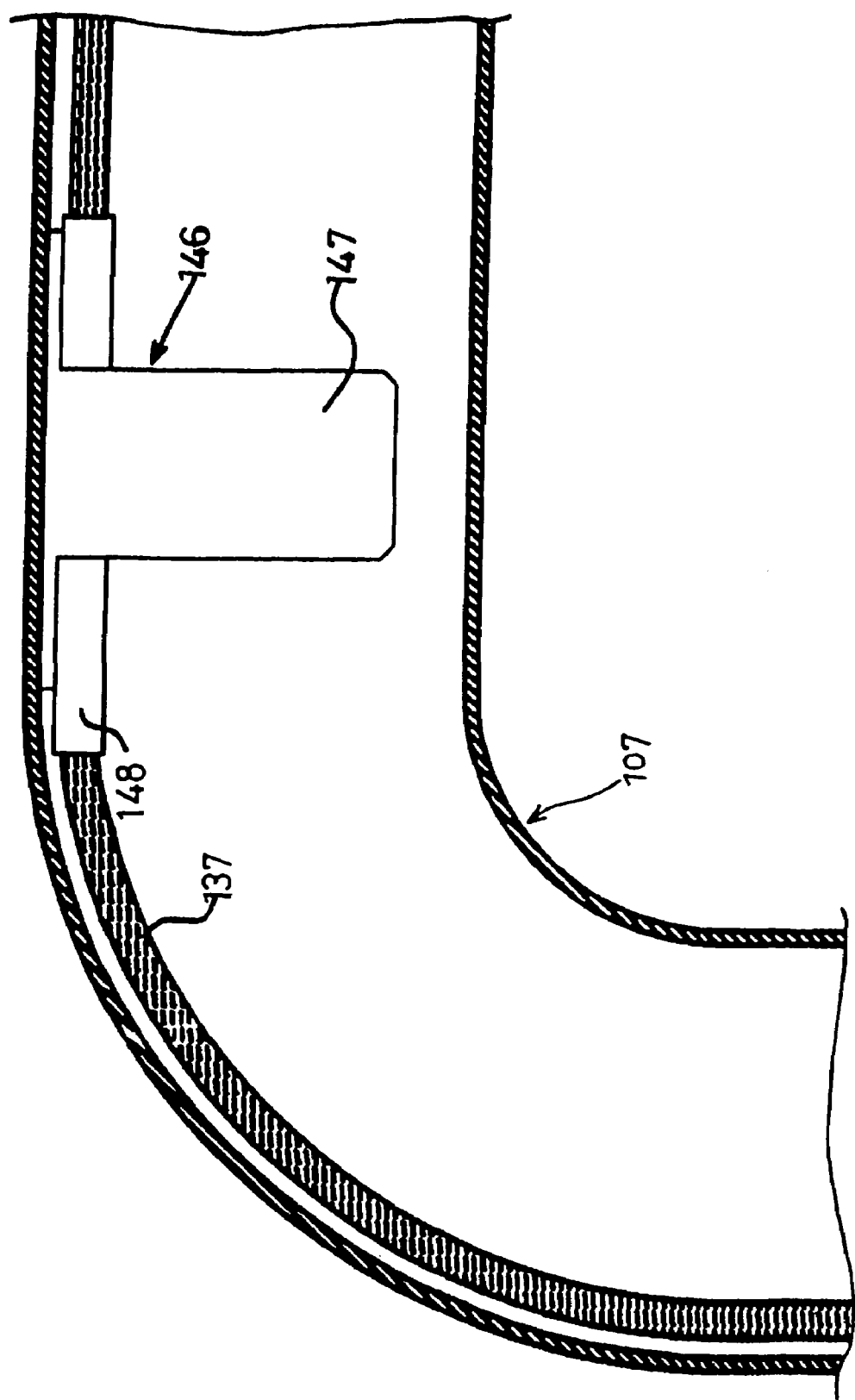
FIG. 28 is a diagram to explain the attachment configuration of a conduit-fixing member used in the construction structure or the construction method of an information-communicable underground pipe relating to another embodiment.

Moreover, to firmly fix the branch tension conduit 137 in the upper part inside the branch pipe 107 even if there is a bend in the branch pipe 107, it is desirable to use a conduit-fixing member 146, for example, one shown in FIG. 28. The conduit-fixing member 146 has a substantially C-shaped cross section and consists of a cylindrical fixing part 147 adapted to the inner surface of the branch pipe 107 and a slide part 148 which is supported by the cylindrical fixing part 147. Using such conduit-fixing member 146 allows the branch tension conduit, which is applied tension thereon, to be installed in the upper part inside the branch pipe (see FIG. 26). Thus, installing the branch tension conduit 137 in the upper part inside the branch pipe prevents it from blocking the flow of sewage, etc. thereby impairing the function as a lifeline, and being broken due to rat bites.

Thus, laying the branch tension conduit 137 along the upper part inside the branch pipe will cause the branch communication cable 121 to be laid from the guide conduit to the branch sewage box 143. The branch sewage box 143 is opened in the vicinity of each household 108, and the branch communication cable 121 guided up to the branch sewage box 143 is drawn out to the ground and thereafter drawn into a cable-termination box 144 installed at each household 108.

Figure 23:
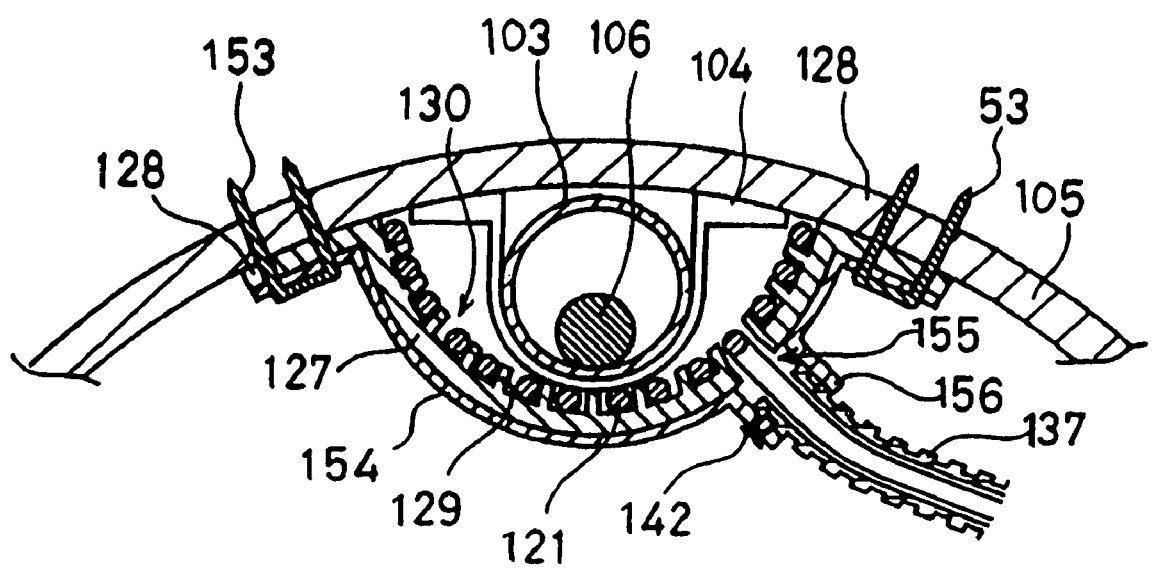
FIG. 23 is a sectional view to show a state that a guide conduit relating to an example of another embodiment is attached to the main pipe.

The above described configuration in which the branch tension conduit 137 is branched off from the guide conduit can be equally applied to the guide conduit (127, 131) which is integrally attached to the upper part of the inner surface of the main pipe 105 so as to surround the sheath pipe 103 as shown in FIG. 23. That is, the guide conduit 127 of the embodiment IV shown in FIG. 23 is provided with an opening part 155 as with the embodiment shown in FIGS. 18, 21, and 22, and also the branch member 154 attached in such a way to cover the opening part 155 is provided with a hollow branch part 156 which provides communication between the empty room 130 of the guide conduit 127 and the outside, and the branch part 156 and the branch tension conduit 137 are integrated by means of a screw 142. In this branch tension conduit 137, the branch communication cable 121 is installed as with the above described embodiments and laid up to each household 108.

In this regard, the guide conduit 127 is integrally attached to the inner surface of the main pipe 105 at the mounting part 128 together with the branch member 154 with a staple 153. This staple 153 is fixed by squeezing it while melting the main pipe by heating to a high temperature or putting it like a needle.

As described so far, the branch communication cable 121 is first laid in the guide conduit (112, 116, 127, 124, 131), and then each corresponding branch communication cable 121 is laid in the branch pipe 107 leading to the branch sewage box 143 corresponding to each household 8 under the protection of the branch tension conduit 137.

According to this structure, it is possible to achieve a structure with which an underground pipeline consisting of a main pipe 105 which is an information-communicable underground pipe and a branch pipe 107 which is not an information-communicable underground pipe can be constructed as a whole as an information-communicable underground pipe, and with which the branch communication cable 121 can be easily laid in the branch pipe 107. Further, according to this structure, since the branch communication cable 121 is disposed in the branch pipe 107 in a state of being inserted in the branch tension conduit 137, it is possible to readily construct the branch pipe 107 as an information-communicable underground pipe even if the laying path of the branch communication cable 121 is complicated, and also possible to achieve requirements such as that there is no limitation on the connection angle of the branch pipe 107 to the main pipe 105, that the branch pipe does not impair the functions as a lifeline, and that the branch pipe has functions such as water resistance, chemical resistance, rat-proof property, high-pressure cleaning resistance, and others.

When there are a large number of branch pipes 107 connected to the main pipe 105, there will be a increased number of pull members (to be described later) to be inserted in the underground pipeline thereby increasing the risk of entanglement. Therefore, it is desirable to attach a Hock-end undetachably at the end of the branch communication cable 121 or the branch tension conduit 137. The shape of the Hock-end may be a hook-type, a ring-like, and many other shapes, but it is important to configure it in such a way that the outer diameter of the Hock-end is larger than the size of the opening part of the guide conduit so that the tip of the branch communication cable 121 which has been drawn out of the guide conduit will not be retracted into the guide conduit. For example, it is possible to adopt, as the Hock-end, a sphere in which wire of a diameter of about 1 mm is configured to form a sphere having a diameter of about 100 mm or, for example, a plastic ball having a diameter of about 20 mm such as a ping-pong ball. Alternatively, the tip of the branch communication cable 121 or the branch tension conduit 137 may be formed into a shape which allows direct grasping or hanging of the cable. When the Hock-end is connected to the branch communication cable 121 or the branch tension conduit 137, it is preferable to keep the branch communication cable 121 or the branch tension conduit 137 drawn out of the guide conduit by a certain length so that it can be readily hooked or grasped from a branch pipe opening 138.

Moreover, to prevent entanglements of the multiple branch communication cables 121 in the guide conduit, the layout position of the branch communication cable 121 in the guide conduit desirably complies with an orderly layout rule in accordance with the position of the branch pipes extending to each household 108. That is, it is preferable, for example, to comply with a layout rule in which the branch communication cables 121 are placed parallel with one another in the widthwise direction so that a cable located at the outer-most position can be taken out one by one in order from the manhole 109 toward the inside of the main pipe 105 (see FIG. 26).

Next, the construction method of an information-communicable underground pipe according to the present invention, that is the method of application using the construction members according to the present invention such as a guide conduit will be described omitting overlapped portion with the above described construction structure of an information-communicable underground pipe. The following description shows an embodiment of the present invention.

First, on the main pipe 105 in an underground pipeline which is to be constructed as an information-communicable underground pipe by laying branch communication cable 121, the distance between manholes 109 and 110, the distance from manhole 109 to the branch pipe opening 138 of each branch pipe 107 in the main pipe 105, the distance from branch pipe 107 to branch sewage box 143, the depth of the branch sewage box 143, and others are accurately measured using a TV camera and the like (see FIG. 26).

Based on the data acquired from the above described investigation, the length of the guide conduit (hereinafter, in the description of the present embodiment, the term including guide conduits 112, 116, 124, 127, 131 is referred to as "guide conduit"), the mounting position of the branch members (140, 154, and others), and the length of the branch tension conduit 137 are determined and these are pre-assembled. Moreover, during the assembly, an opening part (139, 155, etc.) is provided at the position in the guide conduit corresponding to each branch pipe opening 138, and the branch communication cable 121 is taken out from said opening and inserted into the branch tension conduit 137 branching off from the guide conduit. At this moment, the above described Hock-end is provided on the tip of the branch communication cable 121 or the branch tension conduit 137.

The guide conduit, which has been assembled by the above described preparatory operation, is taken up on a reel drum or the like and carried to the installation site. When introducing the branch tension conduit 137, a Hock-end, or the like, there is a risk that they may be damaged by friction against the inner wall of the main pipe 105 while being moved in the main pipe 105 or trapped by a step or the like in the underground pipeline. Therefore, it is preferable to move the branch tension conduits 137 and others in a state that they are laid in a bundle on a cart or simple boat movable in the main pipe 105, and draw them into the main pipe 105 together with a pull member to be described later.

At an installation site, first a pull member is inserted between manholes 109, 110. As the method for inserting a pull member between the manholes 109 and 110, it is possible to conveniently employ known methods such as pushing in a rigid body such as wire, blowing off an inserting device such as a parachute by air pressure, connection to a self-propelled conduit cart, and others. At this time, a tension mechanism 122, 145 is attached to the manhole 109, 110 and branch sewage box 143 (see FIG. 26).

Next, a guide conduit is installed in the main pipe 105 by connecting one end of the pull member and the guide conduit at an end of the main pipe 105, for example, at the manhole 109, and taking up the pull member from the other manhole 110. In this stage, each opening part provided in the guide conduit comes to a state in which it generally corresponds to a respective branch pipe opening 138. When taking up the guide conduit from one manhole 109 to the other manhole 110, since the guide conduit may be twisted, a twist-prevention device may be interposed between the pull member and the guide conduit. When such a twist-prevention device is used, it is to be taken out after the entire length of the guide conduit is disposed in the main pipe 105.

Next, the branch tension conduit 137 is drawn into the branch pipe 107. In this operation, the Hock-end located at an end of branch communication cable 121 or the branch tension conduit 137 is positioned right below the branch pipe 107 by finely adjusting the position of the guide conduit fore-and-aft in the main pipe 105. Then, the Hock-end attached to one end of the branch communication cable 121 or the branch tension conduit 137 is grasped and taken out from the branch sewage box 143 by inserting an arm-type grasping jig or the like from the branch sewage box 143 while confirming with a TV camera. Alternatively, it is also possible to lay a branch tension conduit 137 in a branch pipe 107 by: inserting a pull member from a branch sewage box 143 to an end of the main pipe 105, for example the manhole 109; connecting the pull member to the branch communication cable 121 or the branch tension conduit 137; and pulling up the pull member from the branch sewage box 143.

Figure 24:
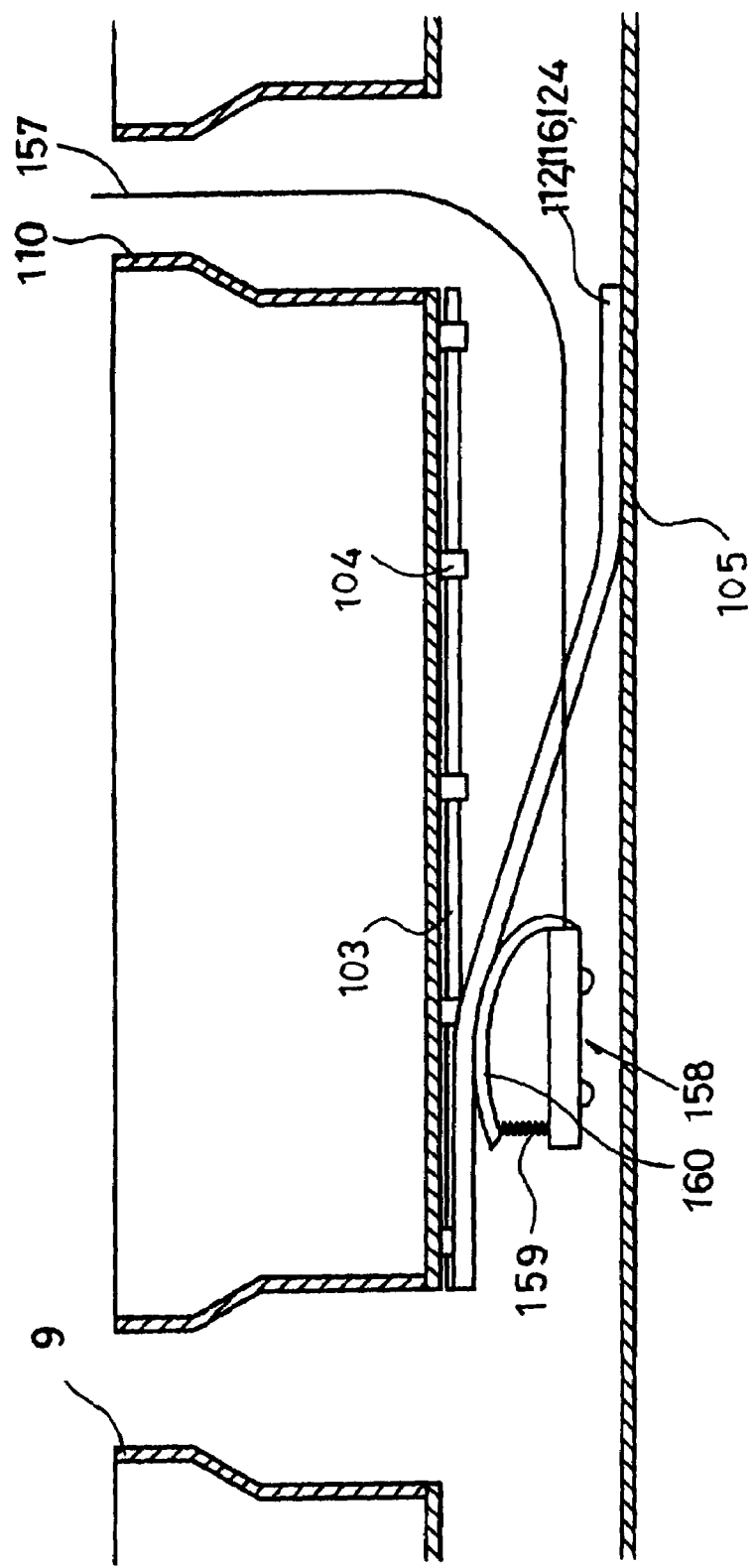
FIG. 24 is a schematic diagram to explain one step of the construction method of an information-communicable underground pipe relating to another embodiment.
Figure 25:
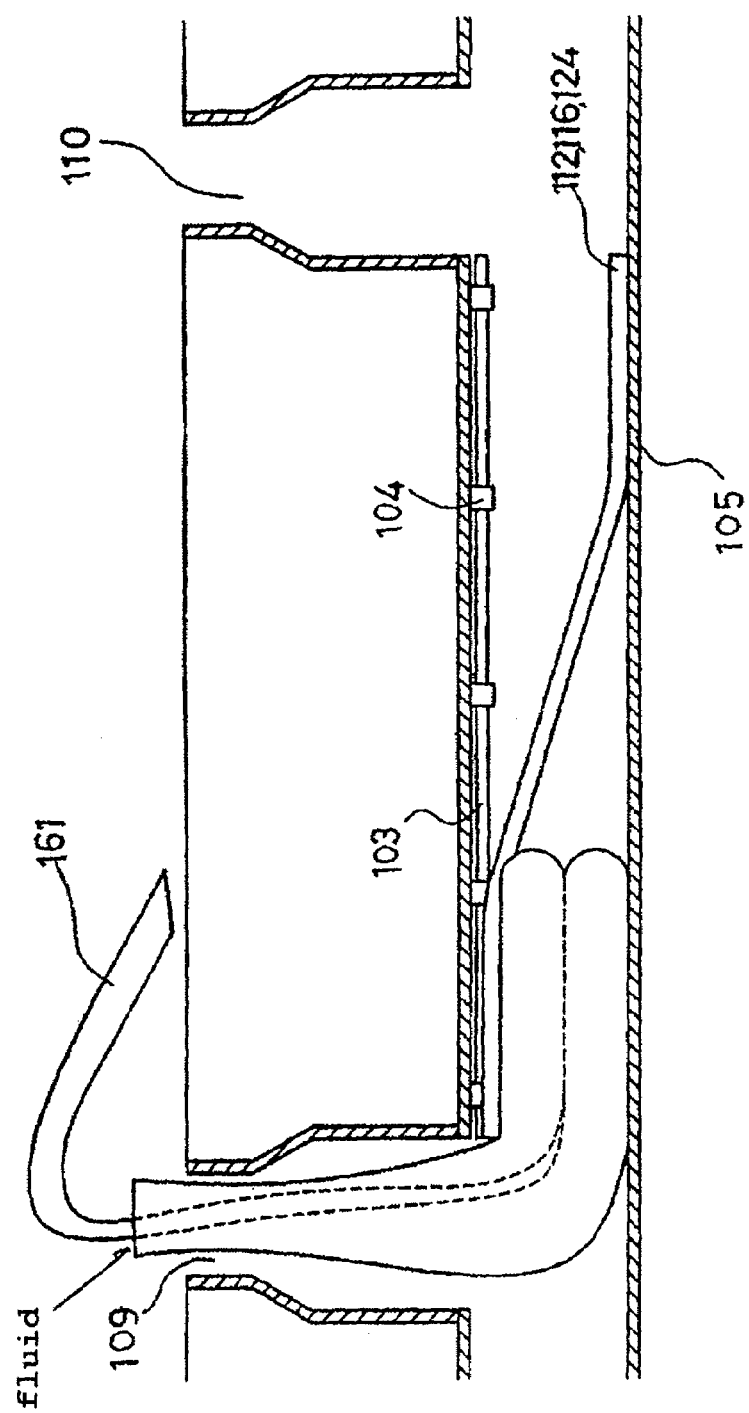
FIG. 25 is a diagram to explain one step of the construction method of the information-communicable underground pipe relating to another embodiment.

Next, the guide conduit (112, 116, 124) is fitted to the sheath pipe 103, or the guide conduit (127, 131) is integrated with the main pipe 105. FIGS. 24, 25 show an embodiment in which the guide conduit is fitted to the sheath pipe. In FIG. 24, a fitting device 158 is introduced into the main pipe 105 by manually fitting one end (left in the figure) of guide conduit from the manhole 109. The fitting device 158 moves in the main pipe 105 by taking up a pull-string 57 pre-installed in the main pipe 105 from the side of the manhole 110. The fitting device performs fitting while moving by pressing the guide conduit (112, 116, 124) with a pressing part 160, which is driven by an urging means 159 provided in the fitting device 158, against the sheath pipe 103. Any device other than the fitting device 158 may be used provided that it can fit the guide conduit (112, 116, 124) onto the sheath pipe 103 by pressing while moving. For example, it is possible to perform the fitting by moving a ball having a diameter which allows the guide conduit (112, 116, 124) to be pressed against the sheath pipe 103.

As shown in FIG. 25, fitting may also be performed continuously by moving a tubular inverted tube 161 in the main pipe 105 by a fluid pressure to press the fitting part of the guide conduit (112, 116, 124) against the sheath pipe 103.

Moreover, when integrating the guide conduit (127, 131) with the inner surface of the main pipe 105, the guide conduit (127, 131) is attached to the main pipe 105 by using a device comprising at least pushing-up means which moves vertically to press the guide conduit (127, 131) against the sheath pipe 103, and means for integrating anchor bolts and the like in the inner surface of the main pipe 105.

Furthermore, to assistively bring the guide conduit closer to the sheath pipe 103 during the attaching operation of the guide conduit to the sheath pipe 103, the guide conduit may be temporarily brought into a suspension by attaching the trunk tension member 120 to a tension mechanism and applying tension thereon in the main pipe 105.

In this case, it is preferable to install the conduit-fixing member 146 in the vicinity of the branch pipe opening 138 in the branch pipe 107 to install the branch tension conduit 137 along substantially upper part of the inner wall of the branch pipe 107. This configuration makes it possible to prevent the impairment of the essential functions of the branch pipe 107. To install a conduit-fixing member 146, first the branch tension conduit 137 which has reached the branch sewage box 143 is inserted into the slide part 148 of the conduit-fixing member 146. The cylindrical fixing part of the conduit-fixing member 146 contracted in diameter and the slide member 148 are moved to the vicinity of the branch pipe opening 138 through the branch pipe 107 with the branch tension conduit 137 being inserted in the slide part 148. An air packer or a dedicated device may be used as supplementary means for this moving and installation operations. For example, the conduit-fixing member 146 is fixed to the inner wall of the branch pipe by: passing an air packer in a shrunk state through the branch pipe 107 from the branch sewage box 143 and inserting it into the inside of the cylindrical fixing part 147 of the conduit-fixing member 146, with the cylindrical fixing part being reduced in diameter; expanding the air packer or the like to hold the cylindrical fixing part 147 of the conduit-fixing member 146; moving the air packer and the like and the conduit-fixing member 146 to the branch pipe opening 138; and releasing the reduced diameter of the cylindrical fixing part 147 of the conduit-fixing member 146 by further expanding the air packer and the like.

Then, the branch tension conduit 137 is firmly fixed in the upper part inside the branch pipe 107 by inserting the branch tension conduit 137, which has been arranged up to the branch sewage box 143, into the tension mechanism 145 with a tension applied thereon and taking it up.

When the branch pipe 107 has a bend in which the slope angle changes sharply, simply applying tension with the tension mechanism 145 will not make the branch tension conduit 137 installed along the upper part of the inner wall of the branch pipe 107. In this case, by conveniently installing conduit-fixing members 146 in the vicinity of the bend in the branch pipe 107, it is made possible to install the branch tension conduit 137 along substantially upper part of the inner wall of the branch pipe 107 even when the branch pipe has a bend.

Moreover, to securely fix the guide conduit in the upper part of the inner surface of the main pipe 105, it is desirable to install sagging-prevention members 150 shown in FIG. 27 at a proper spacing in the main pipe 105 (see FIG. 26).

As so far described, it is made possible to lay out the branch communication cables in parallel surrounding the sheath pipe 103 which is installed in the upper part inside the main pipe 105, and also made possible to lay the branch communication cable in the upper part inside the branch pipe 107 connecting to the main pipe 105 thus leading to each household 108.

Furthermore, when a pre-inserted string, for example a tube-like body or a string body made of urethane having a substantially same outer diameter as that of the communication cable has been used, the installation according to the construction method of an information-communicable underground pipe of the present invention is completed by finally replacing the pre-inserted string with a communication cable. Thus, since the pre-inserted string is kept being inserted in the empty room of the guide conduit and in the branch tension conduit 137 until the final step, the communication cable will not be damaged during the installation of the guide conduit, thus stabilizing the construction.

In this regard, in the operation for replacing the pre-inserted string with the communication cable, first a communication cable is connected to one end of the pre-inserted string. This connection may be performed, for example, by crimping a metal ring while abutting one end of the pre-inserted string with one end of the communication cable. Alternatively, when the coating of the branch communication cable 21 and the material of the pre-inserted string 41 are both plastic and the pre-inserted string has a tubular shape, the connection may also be achieved by forming an overlap portion by inserting the tip of the branch communication cable 21 into the pre-inserted string to a proper length, and then press-bonding the overlap portion by means of a thermo-compression bonding or an induction welding to melt and crush the plastic of the overlap portion, thus achieving a substantially step-free shape. By configuring that the pre-inserted string and the branch communication cable 21 have substantially same outer diameter, it is made possible to prevent the breakage of the branch communication cable due to a stress concentration which may be caused when an excess withdrawal force acts on a step portion or the like during the withdrawal of the branch communication cable.

Moreover, the embodiment of the invention may be carried out with modifications shown below.

(1) The geometry of the guide conduit (112, 116, 124), which is attached to the sheath pipe 103 by being fitted to the outside thereof, is not limited to those of the guide conduit embodiments I to III, but any type may be employed provided that a fitting part through which the guide conduit is fitted to the outside of the sheath pipe and an empty room into which a communication cable can be inserted in the lengthwise direction are formed therein.

(2) Moreover, the means for integrating the guide conduit (127, 131), which is to be attached to the main pipe in such a way as to surround the sheath pipe 103, into the inner surface of the main pipe 105 is not limited to using an anchor bolt 128a, an adhesive layer 133, or a staple 154, but various means may be used provided that it allows the guide conduit to be fixed onto the inner surface of the main pipe 105 over the length of the guide conduit.

INDUSTRIAL APPLICABILITY

According to the present invention, it made possible to convert easily an underground pipeline as an information-communicable underground pipe, by fixing the sheath pipe in substantially upper part inside the underground pipeline by applying tension on a high-strength low-elongation material element. Moreover, even when the main body of the sheath pipe is made of a stretchable material, the configuration in which a high-strength low-elongation material element, which is a material having a high-strength low-elongation characteristics, is integrated in the main body along its length provides a strengthening effect. Furthermore, the sheath pipe can be properly installed in an underground pipeline since the high-strength low-elongation material element will not be twisted with respect to the main body when drawing in the sheath pipe, which is integrated with the main body and the high-strength low-elongation material element, into the main pipe for installation.

Moreover, the branch communication cable is installed along the main pipe by being inserted into the empty room of the guide conduit with guide conduit being fitted to the sheath pipe through its fitting part, and further inserted into the branch tension conduit which is in communication with the empty room of the guide conduit of the branch pipe. And, installing this branch tension conduit into the branch pipe will cause the branch communication cable to be laid in the branch pipe. Thus, it is made possible to construct an underground pipeline consisting of a main pipe and branch pipes as an information-communicable underground pipe as a whole, and to install the communication cable into the branch pipe with ease. And, since the communication cable is installed in the branch pipe in a state of being inserted in the branch tension conduit, it is possible to easily cope with the situation in which the laying path is complicated, and also possible to achieve such requirements as that there is no limitation imposed on the connection angle of the branch pipe to the main pipe, that the branch pipe does not impair the functions as a lifeline, and that the branch pipe has functions such as water resistance, chemical resistance, rat-proof property, high-pressure cleaning resistance, and others.

Moreover, the branch communication cable is inserted into the empty room of the guide conduit, and the guide conduit is laid along the main pipe by being integrated with the inner surface of the main pipe in such a way as to surround the sheath pipe, and is further inserted into the branch tension conduit which is in communication with the empty room of the guide conduit at a corresponding position of the branch pipe. Installing this branch tension conduit into the branch pipe will cause the branch communication cable to be laid in the branch pipe at the same time. Thus, the underground pipeline as a whole can be constructed as an information-communicable underground pipe and the communication cable can be laid in the branch pipe with ease.

Furthermore, it is made possible to securely fix the guide conduit in the main pipe and prevent detachment of the fitting of the guide conduit onto the sheath pipe when the guide conduit is fitted to the outside of the sheath pipe, by installing the guide conduit in the upper part inside the main pipe, and applying tension on the trunk tension member, which is pre-inserted in the empty room of the guide conduit, between manholes located at both ends of the main pipe.

Moreover, since a pre-inserted string is kept being inserted in the empty room of the guide conduit and the branch tension conduit until the final step, damages of the communication cable during the installation of the guide conduit will be prevented thus improving the installation stability.

The branch communication cable is laid along the main pipe by being inserted in the empty room of the guide conduit with the guide conduit being fitted to the outside of the sheath pipe, and is further inserted into the branch tension conduit which is in communication with the empty room of the guide conduit at a corresponding position of the branch pipe. And installing the branch tension conduit in the branch pipe causes the branch communication cable to be laid in the branch pipe simultaneously. This makes it possible to achieve a structure for constructing the branch pipe as an information-communicable underground pipe, and a structure which facilitates the laying of the communication cable in the branch pipe. And, since the communication cable is installed in the branch pipe in a state of being inserted in the branch tension conduit, it is possible to easily construct the branch pipe as an information-communicable underground pipe even if the laying path of the communication cable is complicated, and also possible to achieve such requirements as: that there is no limitation imposed on the connection angle of the branch pipe to the main pipe; that there is no impairment of the functions of the branch pipe as a lifeline; and that the branch pipe has functions such as a water resistance, chemical resistance, rat-proof property, high-pressure cleaning resistance, and others.

Moreover, the guide conduit is in a state that it is divided at a portion of the bracket for attaching the sheath pipe and the divided parts are integrally connected by a connecting member, thereby allowing the guide conduit to be easily fitted to the sheath pipe circumventing the bracket portion.

And, since the guide conduit is reliably installed in the upper part inside the main pipe, and the branch tension conduit is installed in the upper part inside the branch pipe, it is made possible to provide a construction structure of an information-communicable underground pipe which would not impair the essential functions as a lifeline for such a conduit as a sewer pipe in which the lower part of the pipe is utilized.

Moreover, using a textile in which a string of a high-strength low-elongation characteristics is used at least in the lengthwise direction as the high-strength low-elongation material element makes the sheath pipe easy to handle and insusceptible to damages during manufacturing and operation in a conduit. Furthermore, upon fixing the sheath pipe in substantially upper part inside an existing pipe by applying tension on the high-tension low-elongation material element, using a textile makes it possible to wind it up by a tension mechanism with a simple structure thereby applying tension on the sheath pipe.

Furthermore, providing a coating on the high-strength low-elongation material element allows use of a string which has a degraded chemical resistance, friction resistance, or cut-resistance, thereby making it possible to select a most cost-effective string having a high-strength low-elongation characteristics out of various kinds of strings.

And, forming the fitting part on the outer surface of the main body allows various types of guide conduits to be fitted to the sheath pipe, thereby making it possible to attach a guide conduit, into which a specified number of communication cable cores can be inserted in accordance with the installation site, by fitting it to the sheath pipe.

Since the high-tension low-elongation material element is longer than the length of the main body, it becomes possible to mount the sheath pipe on the tension mechanism using the high-strength low-elongation material element located at both ends of the sheath pipe, thereby making the structures of the tension mechanism and the ends of the sheath pipe simpler than in the case in which the sheath pipe is installed by applying tension on itself.

Furthermore, forming multiple layers, each of which has a height smaller than twice of the outer diameter of the communication cable, in the empty room makes it possible to achieve a guide conduit in which a communication cable will not climb over an adjacent communication cable even when multiple communication cables are inserted in each layer and thus the layout in each layer will remain unchanged. Thus, entanglements of communication cables or faulty wiring to each household can be prevented.

And, the guide conduit has a mounting part with which it is integrally attached to the inner surface of the main pipe, and can be integrally installed in the main pipe in such a way as to surround the sheath pipe. And the guide conduit has an empty room for inserting communication cables thereinto within its inside and new communication cables can be installed in parallel around the sheath pipe by inserting the communication cables into the empty room. Thus, the communication cable to be inserted into the branch pipe can be easily installed in the main pipe.

The invention claimed is:

1. A construction method of an information-communicable underground pipe, characterized by comprising the steps of:
    inserting a sheath pipe into a main pipe through a manhole, said main pipe and a branch pipe connected to the main pipe being comprised in an underground pipeline, the sheath pipe comprising a main body provided with a first empty room for installing a communication cable thereinto and a high-strength low-elongation material element which is integrally provided in said main body along the lengthwise direction of the main body;
    fixing said sheath pipe in substantially upper part inside the main pipe by fixing said high-strength low-elongation material element onto the inner wall of said manhole by applying tension thereon;
    inserting a guide conduit into said main pipe, after the step of fixing said sheath pipe inside the main pipe, the guide conduit being formed with a fitting part with which the guide conduit can be fitted to said sheath pipe in order that said guide conduit is supported by said sheath pipe and a second empty room for inserting a branch communication cable thereinto, wherein a branch tension conduit to be inserted with said branch communication cable is branched off from the guide conduit, and the branch tension conduit is in communication with said second empty room at the position corresponding to the connection portion between said branch pipe and said main pipe; and
    installing said guide conduit inside said main pipe by pressing said guide conduit against said sheath pipe from beneath in order that said fitting part of said guide conduit is fitted to said sheath pipe, and installing said branch tension conduit inside said branch pipe.

2. A construction method of an information-communicable underground pipe, characterized by comprising the steps of:
    inserting a sheath pipe into a main pipe through a manhole, said main pipe and a branch pipe connected to the main pipe being comprised in an underground pipeline, the sheath pipe comprising a main body provided with a first empty room for installing a communication cable thereinto and a high-strength low-elongation material element which is integrally provided in said main body along the lengthwise direction of the main body;
    fixing said sheath pipe in substantially upper part inside the main pipe by fixing said high-strength low-elongation material element onto the inner wall of said manhole by applying tension thereon;
    inserting a guide conduit into said main pipe, the guide conduit being formed with a second empty room for inserting a branch communication cable thereinto, wherein a branch tension conduit to be inserted with said branch communication cable is branched off from said guide conduit, and the branch tension conduit is in communication with said second empty room at the position corresponding to the connection portion between said branch pipe and said main pipe; and
    installing said guide conduit on the inner surface of said main pipe in such a way as to surround said sheath pipe, and installing said branch tension conduit inside said branch pipe.

3. The construction method of an information-communicable underground pipe according to claim 2, characterized in that a high-strength low-elongation trunk tension member is inserted in said second empty room in advance, and said method further comprises, after the step of installing said guide conduit in said main pipe, the step of:
    urging said guide conduit toward substantially upper part inside said main pipe by applying tension on said trunk tension member between manholes to each of which an end of said main pipe is connected respectively.

4. The construction method of an information-communicable underground pipe according to claim 2, characterized in that a pre-inserted string for replacing a communication cable and/or a branch communication cable is installed in advance in said first empty room of said sheath pipe and/or in said second empty room of said guide conduit and said branch tension conduit, and said method further comprises the final step of:
    replacing said pre-inserted string with a communication cable and/or a branch communication cable.

5. A construction structure of an information-communicable underground pipe, characterized in that:
    an underground pipeline comprises a main pipe and a branch pipe connected to the main pipe;
    a sheath pipe is fixed in substantially upper part inside the main pipe under the condition that tension is applied on a high-strength low-elongation material element, said sheath pipe comprising a main body formed with a first empty room for installing a communication cable thereinto, and a high-strength low-elongation material element being integrally formed in said main body along the length of said main body, and a guide conduit is installed, after said sheath pipe is fixed inside the main pipe, in said main pipe by being pressed against said sheath pipe from beneath in order that said guide conduit is fitted to the outside of said sheath pipe and said guide conduit is supported by said sheath pipe, the guide conduit being formed with a second empty room for installing a branch communication cable thereinto.

6. The construction structure of an information-communicable underground pipe according to claim 5, characterized in that:

said sheath pipe is attached by means of a bracket which is provided on the inner wall of said main pipe at a certain spacing, and said guide conduit fitted to the outside of the sheath pipe is divided into a plurality of parts, which are integrated together by means of a connection member which is provided in such a way as to surround the outside of said bracket.

7. A construction structure of an information-communicable underground pipe, characterized in that:

an underground pipeline comprises a main pipe and a branch pipe connected to the main pipe;

a sheath pipe is fixed in substantially upper part inside the main pipe under the condition that tension is applied on a high-strength low-elongation material element, wherein said sheath pipe comprises a main body formed with a first empty room for installing a communication cable thereinto, and a high-strength low-elongation material element integrally formed in said main body along the length of said main body;

a guide conduit is integrally installed in the inner wall of said main pipe surrounding said sheath pipe, the guide conduit being formed with a second empty room for installing a branch communication cable thereinto; and a branch tension conduit is branched off from said guide conduit and installed in said branch pipe, wherein said branch tension conduit is in communication with said second empty room at the position corresponding to a connecting part between said branch pipe and said main pipe and is installed with said branch communication cable.

8. The construction structure of an information-communicable underground pipe according to claim 7, characterized in that:

a high-strength low-elongation trunk tension member is inserted into said second empty room of said guide conduit; and said guide conduit is urged toward substantially upper part inside said main pipe under the condition that tension is applied on said trunk tension member between manholes and said branch tension conduit is tensioned in said branch pipe so that said branch tension conduit is installed in the upper part inside said branch pipe.

9. A guide conduit which is a construction member of an information-communicable underground pipe for use in further inserting a communication cable and/or a branch communication cable in an underground pipeline comprising a main pipe and a branch pipe connected to the main pipe, wherein a sheath pipe for installing a communication cable thereinto is installed and fixed in a substantially upper part inside said main pipe under the condition that tension is applied on a high-strength low-elongation material element, wherein said sheath pipe comprises a main body formed with a first empty room for installing a communication cable thereinto, and the high-strength low-elongation material element is integrally formed in said main body along the length of said main body, characterized by:

comprising a main body whose cross section is formed in a substantially C-shape, a mounting part with which said guide conduit is integrally attached to the inner face of said underground pipeline in such a way as to surround said sheath pipe, and a sectioned cable-receiving space formed in the inner periphery of said main body, said sectioned cable-receiving space extending in the lengthwise direction and being a second empty room between said main body and the inner face of said main pipe for inserting a communication cable and/or a branch communication cable thereinto by being attached to said main pipe;

wherein a branch tension conduit to be inserted with a branch communication cable is branched off from said guide conduit and in communication with said second empty room.

10. A construction method of an information-communicable underground pipe, characterized by comprising the steps of:

inserting a sheath pipe into a main pipe through a manhole, said main pipe and a branch pipe connected to the main pipe being comprised in an underground pipeline, the sheath pipe comprising a main body provided with a first empty room for installing a communication cable thereinto and a high-strength low-elongation material element which is integrally provided in said main body along the lengthwise direction of the main body;

fixing said sheath pipe in substantially upper part inside the main pipe by fixing said high-strength low-elongation material element onto the inner wall of said manhole by applying tension thereon;

inserting a guide conduit into said main pipe, the guide conduit being formed with a fitting part with which the guide conduit can be fitted to said sheath pipe in order that said guide conduit is supported by said sheath pipe and a second empty room for inserting a branch communication cable thereinto, wherein a branch tension conduit to be inserted with said branch communication cable is branched off from the guide conduit, and the branch tension conduit is in communication with said second empty room at the position corresponding to the connection portion between said branch pipe and said main pipe; and installing said guide conduit inside said main pipe by fitting said fitting part of said guide conduit to said sheath pipe, and installing said branch tension conduit inside said branch pipe, wherein a high-strength low-elongation trunk tension member is inserted in said second empty room in advance, and said method further comprises, after the step of installing said guide conduit in said main pipe, the step of:

urging said guide conduit toward substantially upper part inside said main pipe by applying tension on said trunk tension member manholes to each of which an end of said main pipe is connected respectively.

11. A construction method of an information-communicable underground pipe, characterized by comprising the steps of:

inserting a sheath pipe into a main pipe through a manhole, said main pipe and a branch pipe connected to the main pipe being comprised in an underground pipeline, the sheath pipe comprising a main body provided with a first empty room for installing a communication cable thereinto and a high-strength low-elongation material element which is integrally provided in said main body along the lengthwise direction of the main body;

fixing said sheath pipe in substantially upper part inside the main pipe by fixing said high-strength low-elongation material element onto the inner wall of said manhole by applying tension thereon;

inserting a guide conduit into said main pipe, the guide conduit being formed with a fitting part with which the guide conduit can be fitted to said sheath pipe in order that said guide conduit is supported by said sheath pipe and a second empty room for inserting a branch communication cable thereinto, wherein a branch tension conduit to be inserted with said branch communication cable is branched off from the guide conduit, and the branch tension conduit is in communication with said second empty room at the position corresponding to the connection portion between said branch pipe and said main pipe; and installing said guide conduit inside said main pipe by fitting said fitting part of said guide conduit to said sheath pipe, and installing said branch tension conduit inside said branch pipe, wherein a pre-inserted string for replacing a communication cable and/or a branch communication cable is installed in advance in said first empty room of said sheath pipe and/or in said second empty room of said guide conduit and said branch tension conduit, and said method further comprises the final step of:

replacing said pre-inserted string with a communication cable and/or a branch communication cable.

12. A construction structure of an information-communicable underground pipe, characterized in that:

an underground pipeline comprises a main pipe and a branch pipe connected to the main pipe, a sheath pipe is fixed in substantially upper part inside the main pipe under the condition that tension is applied on a high-strength low-elongation material element, said sheath pipe comprising a main body formed with a first empty room for installing a communication cable thereinto, and a high-strength low-elongation material element being integrally formed in said main body along the length of said main body, a guide conduit is installed in said main pipe by being fitted to the outside of said sheath pipe in order that said guide conduit is supported by said sheath pipe, the guide conduit being formed with a second empty room for installing a branch communication cable thereinto, a high-strength low-elongation trunk tension member is inserted into said second empty room of said guide conduit; and said guide conduit is urged toward substantially upper part inside said main pipe under the condition that tension is applied on said trunk tension member between manholes and said branch tension conduit is tensioned in said branch pipe so that said branch tension conduit is installed in the upper part inside said branch pipe.

13. The construction structure of an information-communicable underground pipe according to claim 12, characterized in that:

said sheath pipe is attached by means of a bracket which is provided on the inner wall of said main pipe at a certain spacing, and said guide conduit fitted to the outside of the sheath pipe is divided into a plurality of parts, which are integrated together by means of a connecting member which is provided in such a way as to surround the outside of said bracket.

* * * * *